(12) United States Patent
Yoshida et al.

(10) Patent No.: US 11,245,314 B2
(45) Date of Patent: Feb. 8, 2022

(54) METHOD OF POSITIONING AND FIXING OF STATOR CORE AND APPARATUS FOR SAME

(71) Applicant: HONDA MOTOR CO., LTD., Tokyo (JP)

(72) Inventors: Takashi Yoshida, Tochigi-ken (JP); Takao Inoue, Tochigi-ken (JP); Osamu Shino, Tochigi-ken (JP); Minoru Ota, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 260 days.

(21) Appl. No.: 16/554,764

(22) Filed: Aug. 29, 2019

(65) Prior Publication Data
US 2020/0076280 A1 Mar. 5, 2020

(30) Foreign Application Priority Data

Sep. 4, 2018 (JP) .............................. JP2018-165089

(51) Int. Cl.
*H02K 15/02* (2006.01)
*B21D 28/32* (2006.01)

(52) U.S. Cl.
CPC ........... *H02K 15/024* (2013.01); *B21D 28/32* (2013.01); *Y10T 29/49009* (2015.01); *Y10T 29/53143* (2015.01)

(58) Field of Classification Search
CPC ...... H02K 15/02; H02K 15/024; H02K 15/06; H02K 15/062; H02K 15/064; Y10T 29/49009; Y10T 29/49073; Y10T 29/53143; Y10T 29/53152; Y10T 29/53265

See application file for complete search history.

(56) References Cited

U.S. PATENT DOCUMENTS

| | | | |
|---|---|---|---|
| 6,249,956 B1 * | 6/2001 | Maeda | H02K 15/0428 140/102.5 |
| 2010/0018039 A1 * | 1/2010 | Sakakiabara | H02K 15/022 29/732 |
| 2014/0013592 A1 | 1/2014 | Yoshida et al. | |
| 2016/0190876 A1 * | 6/2016 | Mizutani | H02K 3/38 310/91 |
| 2016/0233749 A1 * | 8/2016 | Ueno | H02K 15/085 |
| 2016/0241115 A1 * | 8/2016 | Ono | H02K 15/02 |

FOREIGN PATENT DOCUMENTS

JP 5841017 1/2016

* cited by examiner

*Primary Examiner* — Peter Dungba Vo
*Assistant Examiner* — Joshua D Anderson
(74) *Attorney, Agent, or Firm* — Amin, Turocy & Watson, LLP

(57) ABSTRACT

A positioning and fixing apparatus that fixes a position of a stator core includes a plurality of positioners that are displaced so as to approach or separate from the stator core, by a positioner displacing unit. One of the positioners is an engager that engages with a first tab section being an engaging section. First, the engager engages with the first tab section, and then, pressers being the remainder of the positioners position a certain region of the stator core.

9 Claims, 21 Drawing Sheets

(INWARD) ← → (OUTWARD)

METHOD OF POSITIONING AND FIXING OF STATOR CORE AND APPARATUS FOR SAME

CROSS-REFERENCE TO RELATED APPLICATION

This application is based upon and claims the benefit of priority from Japanese Patent Application No. 2018-165089 filed on Sep. 4, 2018, the contents of which are incorporated herein by reference.

BACKGROUND OF THE INVENTION

Field of the Invention

The present invention relates to a method of positioning and fixing of stator core at a time of an electrical conductor being inserted in a slot formed in a stator core, and relates to an apparatus for the same.

Description of the Related Art

There is known as a stator configuring a rotary electrical machine such as a motor or generator one which includes: a stator core that has slots formed therein; and an electrical conductor (hereafter, also written as "segment") that has two legs and a curved section and is substantially U-shaped. As described in Japanese Patent No. 5841017, this kind of stator is configured by the legs being inserted in the slots, and furthermore, by legs exposed from the slots being joined and thereby electrically connected.

Note that in the technology of Japanese Patent No. 5841017, there is configured an insertion device that includes two increasingly-opening plates, that is, a first increasingly-opening plate and a second increasingly-opening plate per one slot, and a configuration is adopted whereby the legs are guided by these first increasingly-opening plate and second increasingly-opening plate.

SUMMARY OF THE INVENTION

If a large positional misalignment of the first increasingly-opening plate and the second increasingly-opening plate occurs with respect to the slot, then the legs may fail to be inserted in the slot. In this case, since an insertion operation must be performed again, the stator cannot be efficiently obtained. Moreover, there is also concern that if the segment contacts the stator core, the segment will be damaged.

A main object of the present invention is to provide a method of positioning and fixing of stator core that enables a relative position of a slot formed in a stator core and an electrical conductor to be appropriately set.

Another object of the present invention is to provide a positioning and fixing apparatus of stator core that facilitates insertion in the slot of the electrical conductor.

In order to achieve the previously described objects, an aspect of the present invention provides a method of positioning and fixing of stator core in which, when a stator is obtained by inserting an electrical conductor in a slot formed in a stator core provided with an engaging section, the stator core is positioned and fixed by a positioning and fixing apparatus which comprises a plurality of positioners that are displaced in a direction of approaching or separating from the stator core from an outer side of the stator core, the method of positioning and fixing of stator core including:

an engaging step in which an engager being one of the plurality of positioners is displaced in a direction of approaching the stator core, and engages with the engaging section, whereby the stator core is preliminary positioned and fixed; and a main positioning step in which an as-yet-non-positioning positioner, of the plurality of positioners is displaced in a direction of approaching the stator core, and positions a certain region of the stator core, whereby the stator core is positioned and fixed.

Thus, in the present invention, a configuration is adopted whereby first, the stator core undergoes preliminary positioning and fixing by the engager (one of the plurality of positioners) configuring the positioning and fixing apparatus, and then, the stator core undergoes main positioning and fixing by the other positioners. As a result, for example, after positional misalignment or posture of the stator core has been corrected to set it in a regular position or posture by preliminary positioning, the stator core that has attained the regular position or posture can undergo main positioning.

Hence, the relative position of the slot formed in the stator core and the electrical conductor is appropriately set. As a result, insertion in the slot of the electrical conductor is facilitated.

Note it is preferable that the stator core is further provided with a sub-engaging section, and that the positioning and fixing apparatus is further provided with a sub-engager that is provided in a position facing the engager, as one of the plurality of positioners. Moreover, a sub-engaging step in which the sub-engager is displaced in a direction of approaching the stator core and thereby engages with the sub-engaging section, is preferably performed between the engaging step (preliminary positioning) and the main positioning step.

In this case, the stator core undergoes preliminary positioning by the engager, and furthermore, undergoes preliminary positioning at two diagonally opposing points due to the sub-engager. Thus, it is difficult for rotation (due to a phase shift or an out-of-phase position) to subsequently occur in the stator core that has undergone preliminary positioning due to the engager and the sub-engager in a position facing the engager. That is, so-called whirl-stop of the stator core can be achieved before the remainder of the positioners abut on the stator core.

In this case, if a pressing force applied to the stator core from the sub-engager is configured larger compared to a pressing force applied to the stator core from the engager, then there is a possibility that the stator core is pressed thereby causing a phase shift when the sub-engager abuts on the stator core. In order to prevent this, a pressing force applied to the stator core from the sub-engager is preferably configured smaller compared to a pressing force applied to the stator core from the engager.

Moreover, another aspect of the present invention provides a positioning and fixing apparatus of stator core which includes a plurality of positioners that, when a stator is obtained by inserting an electrical conductor in a slot formed in a stator core provided with an engaging section, are displaced in a direction of approaching or separating from the stator core from an outer side of the stator core, one of the plurality of positioners being configured as an engager that is displaced in a direction of approaching the stator core and thereby configured to engage with the engaging section, the positioning and fixing apparatus of stator core including:

an engager displacing unit configured to displace the engager; and a positioner displacing unit configured to displace a remainder of the positioners separately from the engager, and the remainder of the positioners being displaced in a direction of approaching the stator core and thereby configured to position a certain region of the stator core.

By adopting such a configuration, the stator core can be set to the regular position or posture by the positioners including the engager, and positioning performed while achieving whirl-stop. Hence, the relative position of the slot formed in the stator core and the electrical conductor can be appropriately set. That is, insertion in the slot of the electrical conductor can be facilitated while adopting a simple configuration.

The engager is preferably provided with a rolling body configured to make sliding contact with the engaging section. This is because since the rolling body slides relatively along the engaging section, the engager is enabled to easily engage with the engaging section.

As described above, it is preferable that the stator core is provided with a sub-engaging section, and that one provided in a position facing the engager, of the plurality of positioners is configured as a sub-engager that engages with the sub-engaging section. Of course, in this case, the positioner displacing unit includes a sub-engager displacing unit configured to displace the sub-engager separately from the engager and the remainder of the positioners.

In this configuration, since the stator core can be preliminarily positioned at two diagonally opposing points due to the engager and the sub-engager, phase shift of the stator core can be avoided (whirl-stop can be achieved) before the remainder of the positioners abut on the stator core.

The sub-engager too, similarly to the engager, is preferably provided with a rolling body configured to make sliding contact with the sub-engaging section. As a result, the rolling body slides relatively along the sub-engaging section, whereby the sub-engager easily engages with the sub-engaging section.

Moreover, a driving force on the sub-engager of the sub-engager displacing unit is preferably set smaller compared to a driving force on the engager of the engager displacing unit. As a result, the pressing force applied to the stator core from the sub-engager becomes smaller compared to the pressing force applied to the stator core from the engager. Hence, concern that the stator core is pressed thereby causing a phase shift when the sub-engager abuts on the stator core, is dispelled.

In all cases, a guide member configured to guide a certain region of the electrical conductor into the slot is preferably provided above the positioner (including the engager and sub-engager). In this case, the guide member is displaced simultaneously with the positioner. Hence, it is arranged that in a process of the stator core being positioned by the positioner approaching and abutting on the stator core, the guide member is positioned relatively to the slot. That is, positions of the guide member and the slot are precisely matched. It therefore becomes easy for the certain region of the electrical conductor to be guided into the slot.

Due to the present invention, since a configuration is adopted whereby the stator core is positioned and fixed using positioners, along with there being a simple configuration, it becomes easy for the electrical conductor to be inserted in the slot. Consequently, the stator can be efficiently obtained. Moreover, since the legs are prevented from contacting the stator core without being inserted in the slot, concern that the segment will be damaged, is dispelled.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a method of positioning and fixing of stator core according to the present invention will be presented and described in detail below with reference to the accompanying drawings, in relation to a positioning and fixing apparatus for implementing the method.

Figure 1:
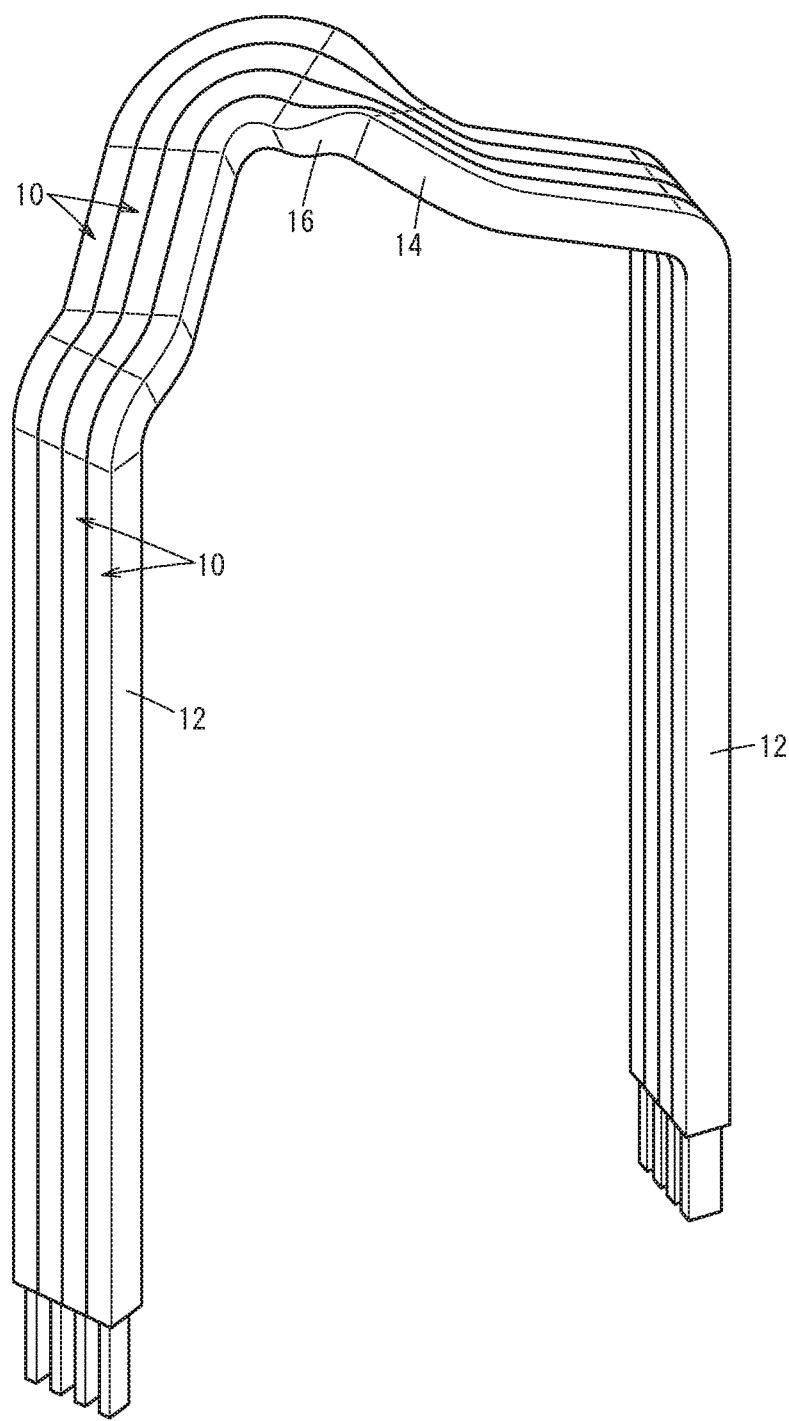
FIG. 1 is a schematic overall perspective view of an electrical conductor (a segment) representing an electromagnetic coil of a stator.

First, a segment 10 (an electrical conductor) shown in FIG. 1 will be described. The segment 10 includes: two legs 12; and a turn section 14 interposing between the legs 12. The turn section 14 is bent so as to be directed from one of the legs 12 toward the other of the legs 12, and, as a result, the segment 10 is substantially U-shaped.

A crank section 16 of meandering shape is formed in the turn section 14. Due to this crank section 16, a shift in direction along a radial direction of a stator core occurs in the segment 10.

Figure 2:
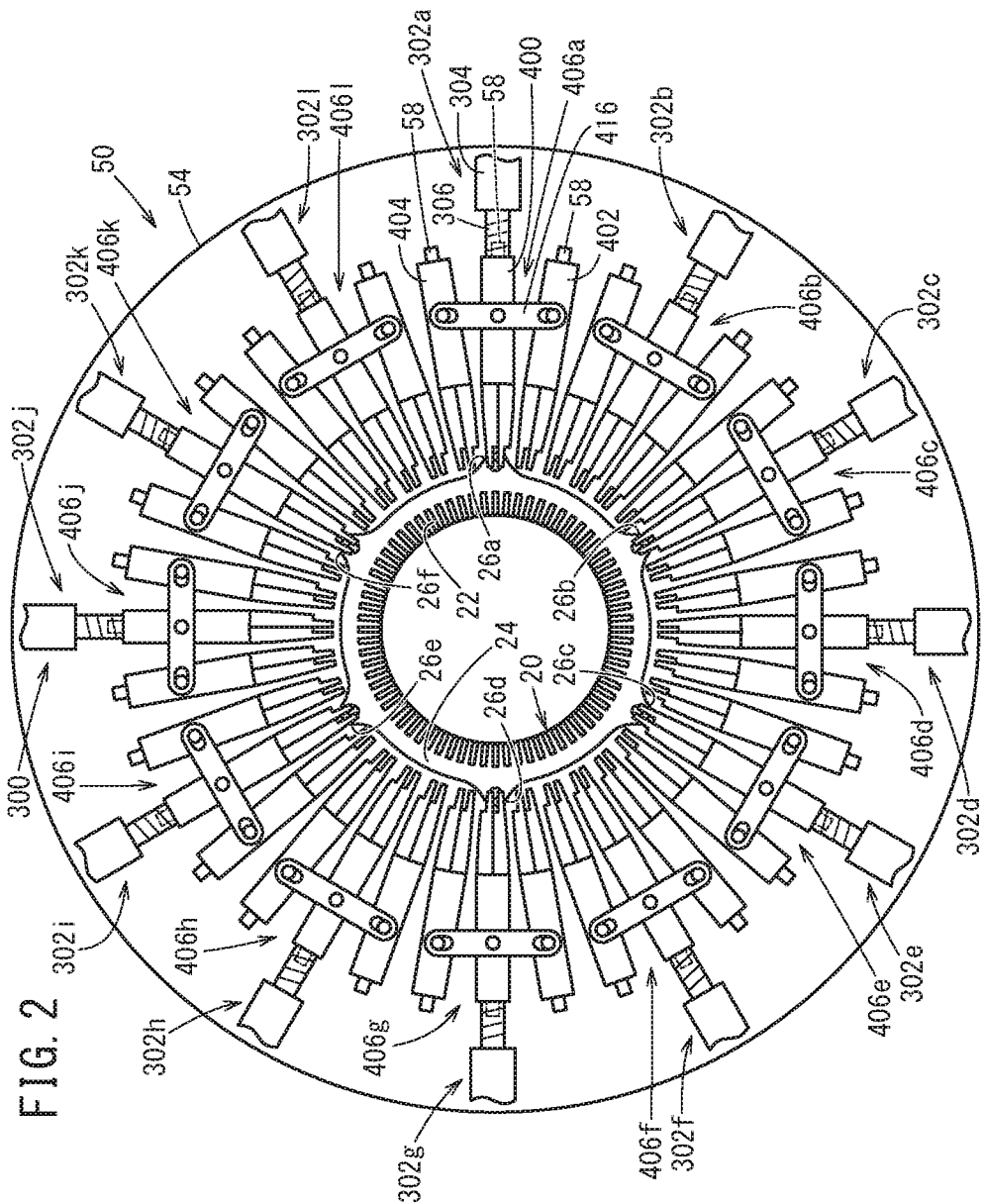
FIG. 2 is a schematic plan view showing a stator core to be inserted with the segment, and an outer peripheral side guide section configuring a leg inserting apparatus including a positioning and fixing apparatus according to an embodiment of the present invention.
Figure 3:
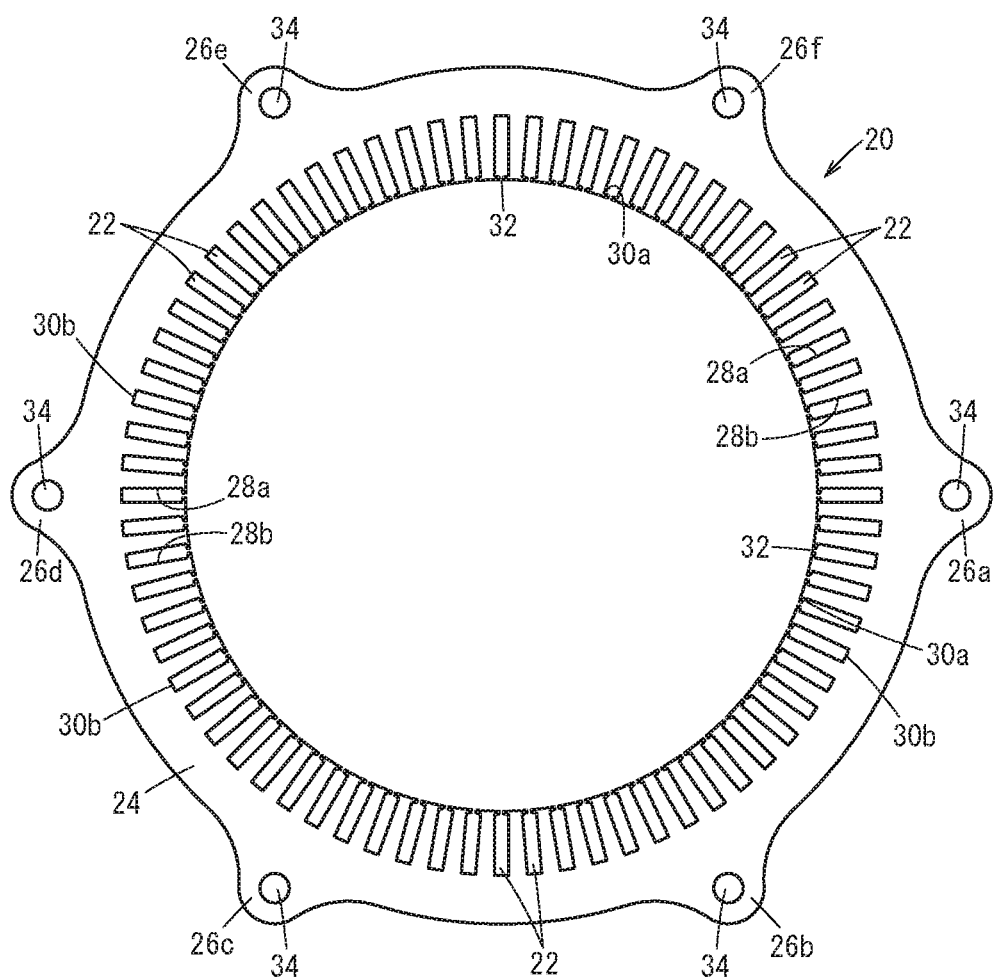
FIG. 3 is an enlarged plan view of the stator core shown in FIG. 2.

The legs 12 are inserted in a plurality of slots 22 formed in a stator core 20 shown in FIGS. 2 and 3. The stator core 20 is configured as a laminated body of thin core plates that have been laminated in a direction orthogonal to a paper surface of FIG. 2, for example, and includes: an annular section 24; and first through sixth tab sections 26a-26f that project outwardly in a diametric direction from an outer peripheral section of the annular section 24. The slots 22 are formed so as to extend radially to an inner peripheral side of the annular section 24. In this case, the number of slots 22 is 72.

For each of the slots 22, a direction along a diametric direction of the annular section 24 represents a longitudinal direction of the slot 22. Ultimately, the slot 22, as shown in FIG. 3, includes: two long sides, that is, a first long side 28a on a downstream side clockwise and a second long side 28b on an upstream side clockwise that extend along the diametric direction of the annular section 24; and two short sides, that is, a first short side 30a on an inner peripheral side and a second short side 30b on an outer peripheral side that extend along a circumferential direction of the annular section 24. Note that the first short side 30a has part thereof cut out. Due to this cutout, an inner peripheral side groove 32 that opens facing an inner peripheral side of the annular section 24, is formed in the first short side 30a.

The first through sixth tab sections 26a-26f are provided so as to be separated from each other at equal intervals. Although the first through sixth tab sections 26a-26f each have a shape approximated to an isosceles triangle having the outer peripheral section of the annular section 24 as its base and the base as its longest side, their projecting tips are each curved and rounded. A fastening hole 34 is formed in substantially a center of each of the first through sixth tab sections 26a-26f. A bolt (not illustrated) being a fastening member for linking a stator ST (refer to FIG. 21) to a casing and securing plate cores, is passed into this fastening hole 34.

The first tab section 26a of the first through sixth tab sections 26a-26f functions as an engager, and the fourth tab section 26d whose phase difference is approximately 180° with respect to the first tab section 26a functions as a sub-engager. This will be mentioned later.

Next, a positioning and fixing apparatus according to the present embodiment will be described. FIG. 2 is a principal part schematic plan view of a leg inserting apparatus for obtaining the stator ST from the segment 10 and the stator core 20. This leg inserting apparatus is configured including a positioning and fixing apparatus 300 that fixes a position of the stator core 20.

Figure 4:
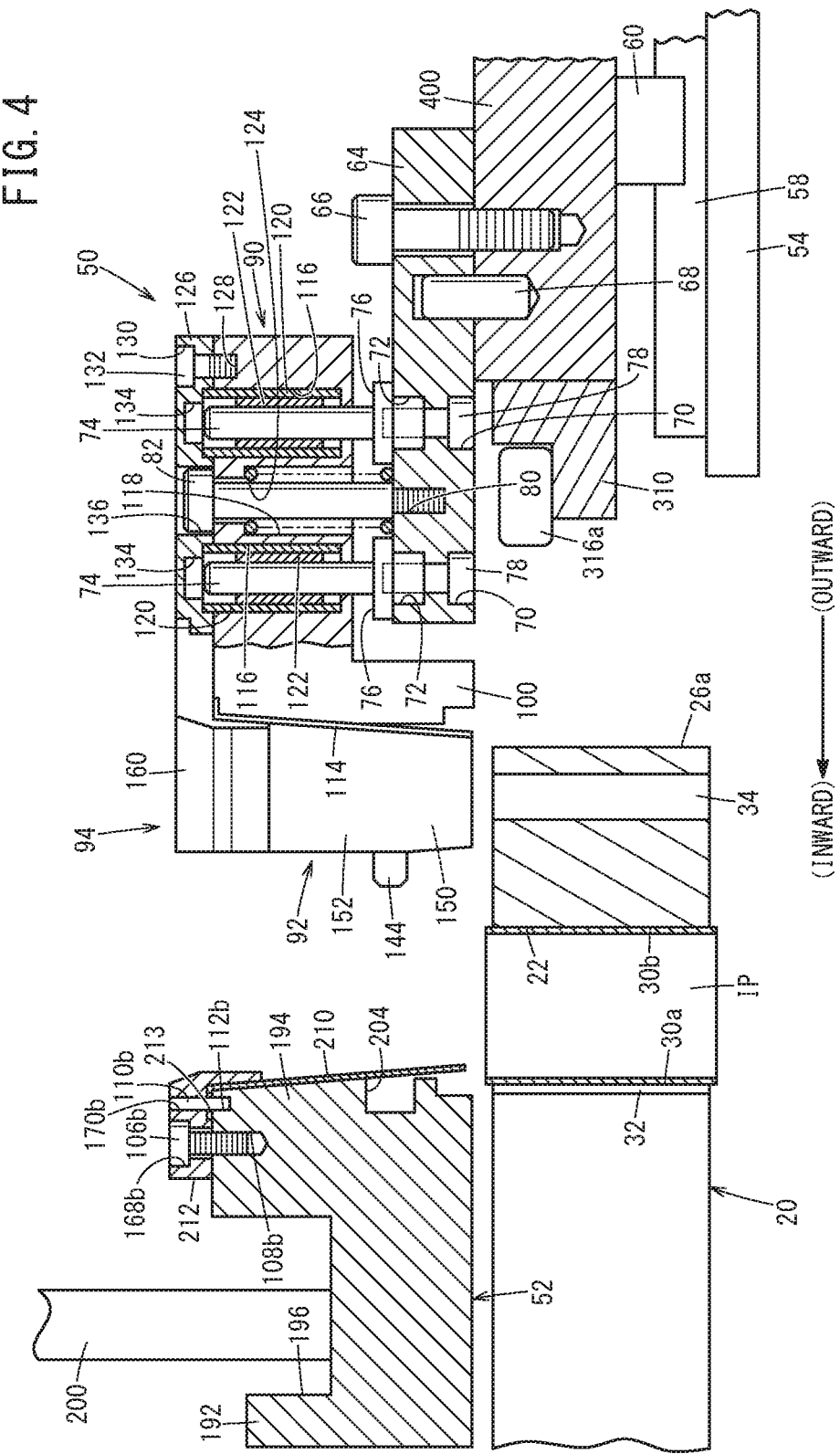
FIG. 4 is a partial cross-sectional side view of an inner peripheral side guide section, the stator core, and the outer peripheral side guide section.

The leg inserting apparatus includes: an outer peripheral side guide section 50 shown in FIGS. 2 and 4; and an inner peripheral side guide section 52 shown in FIG. 4. The outer peripheral side guide section 50 surrounds an outer periphery of the stator core 20 which has been positioned and fixed in a certain place under action of the positioning and fixing apparatus 300, while the inner peripheral side guide section 52 is inserted, in a manner enabling it to be advanced/retracted, on the inner peripheral side of the stator core 20.

The outer peripheral side guide section 50 includes a disk-shaped pedestal 54 shown in FIG. 4. Thirty-six guide rails 58 each extending along the diametric direction of the annular section 24 are laid on the pedestal 54, and any one of a driving slider 400, a first driven slider 402, and a second driven slider 404 is provided, in a displaceable manner, via a sliding body 60, on each of the guide rails 58. The driving slider 400 is disposed so as to be sandwiched between the first driven slider 402 and the second driven slider 404. The driving slider 400, the first driven slider 402, and the second driven slider 404 configure a single set of a slider unit by these three items of the sliders 400, 402, and 404. In the present embodiment, 12 sets of the slider units, that is, first through twelfth slider units 406a-406l are provided.

Figure 5:
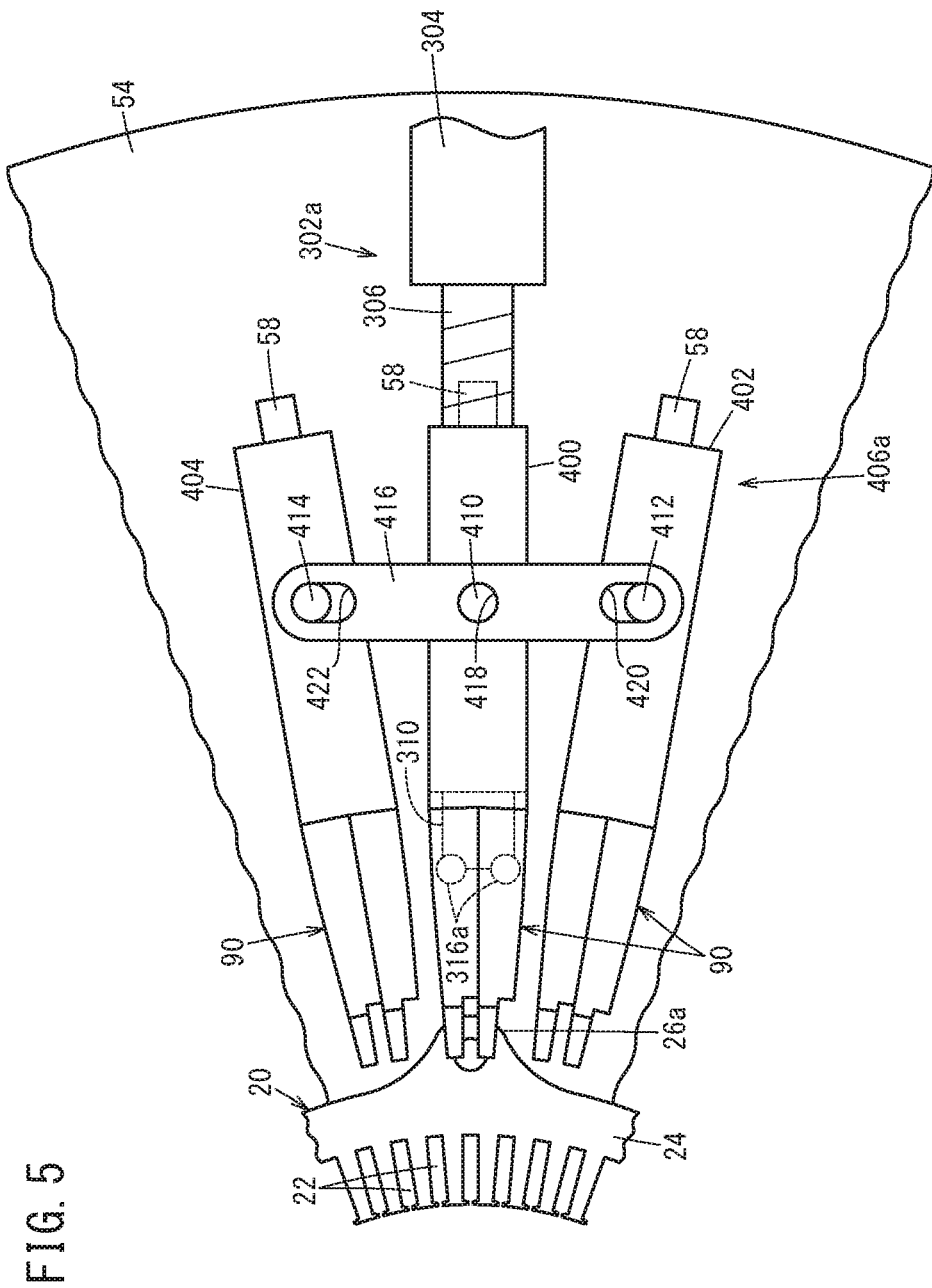
FIG. 5 is a principal part schematic plan view of a slider unit configured by a driving slider, a first driven slider, and a second driven slider.

As shown in detail in FIG. 5, a pin-shape fitting section 410 is formed in a projecting manner on an upper surface of the driving slider 400, and a first displacement assisting cam follower 412 and a second displacement assisting cam follower 414 are respectively formed in a projecting manner on upper surfaces of the first driven slider 402 and the second driven slider 404. In addition, a long, flat plate-shaped link member 416 is bridged from the first driven slider 402 to the second driven slider 404 via the driving slider 400. A coupling hole 418 is formed in a penetrating manner in substantially a center section in a longitudinal direction of the link member 416, and a first long hole 420 and a second long hole 422 are formed in a penetrating manner in both end sections of the link member 416. The pin-shape fitting section 410 is fitted to the coupling hole 418, and the first displacement assisting cam follower 412 and the second displacement assisting cam follower 414 are respectively passed into the first long hole 420 and the second long hole 422.

The first through twelfth slider units 406a-406l are displaced so as to approach or separate from each other along the diametric direction of the annular section 24 of the stator core 20, under action of, respectively, first through twelfth actuators 302a-302l that configure the positioning and fixing apparatus 300. More specifically, the first through twelfth actuators 302a-302l each include: a servomotor 304; and a guide shaft 306 that advances or retracts under action of the servomotor 304. As shown exemplifying the first actuator 302a in FIG. 5, the driving slider 400 is coupled to a tip of the guide shaft 306 of the first actuator 302a.

That is, when the guide shaft 306 of the first actuator 302a advances or retracts, the driving slider 400 advances or retracts integrally with the guide shaft 306. Since the first driven slider 402 and the second driven slider 404 are coupled to the driving slider 400 via the link member 416, the first driven slider 402 and the second driven slider 404 advance or retract following the driving slider 400.

Now, front ends facing the stator core 20 of each of the driving sliders 400 of the first actuator 302a and the seventh actuator 302g are provided with an engager 310 and a sub-engager 312 (both of which are positioners; refer to FIG. 12 in particular) that are capable of engaging with, respectively, the first tab section 26a and the fourth tab section 26d. The engager 310 and the sub-engager 312 are in a positional relationship of facing each other, and have a phase difference of approximately 180°.

Figure 6:
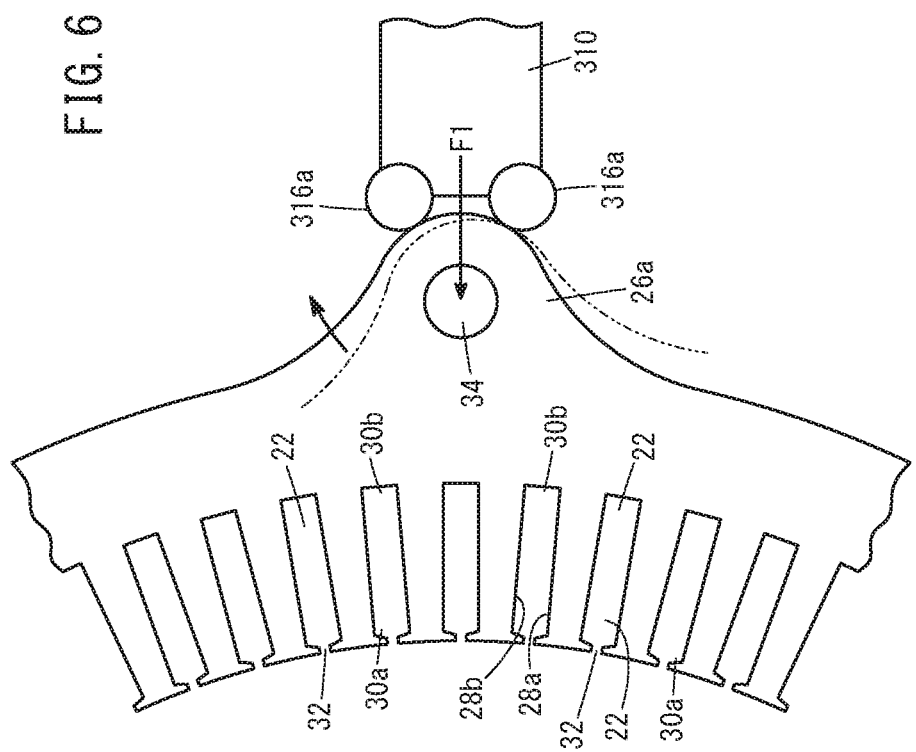
FIG. 6 is a principal part enlarged plan view of a first tab section (an engaging section) of the stator core, and an engager provided in the driving slider.

FIG. 6 is a principal part enlarged plan view of the engager 310. Note that illustration of the likes of a bracket 64 or support block 90 (regarding both of these, refer to FIG. 4) which will be mentioned later, is omitted. As shown in this FIG. 6, a pair of aligning cam followers 316a are provided as rolling bodies in a tip of the engager 310. The first tab section 26a enters between the paired aligning cam followers 316a thereby engaging. The sub-engager 312 too similarly has its tip provided with a pair of aligning cam followers 316b (refer to FIG. 12). The fourth tab section 26d enters between the paired aligning cam followers 316b thereby engaging.

As will be mentioned later, the stator core 20 is sandwiched by being pressed by pressing forces F1, F2 oriented in opposite directions to each other, by the engager 310 that has engaged with the first tab section 26a and the sub-engager 312 that has engaged with the fourth tab section 26d. Note that the pressing force F1 with which the engager 310 presses the first tab section 26a, in other words, a driving force applied to the engager 310 from the servomotor 304 is set larger compared to the pressing force F2 (a driving force applied to the sub-engager 312) with which the sub-engager 312 presses the fourth tab section 26d.

In contrast, a presser 314 (the positioner; refer to FIG. 12 in particular) whose tip is a flat surface is formed in a projecting manner in each of the driving sliders 400 of the remaining second through sixth actuators 302b-302f and eighth through twelfth actuators 302h-302l. Among these, the pressers 314 of the third actuator 302c, the fifth actuator 302e, the ninth actuator 302i, and the eleventh actuator 302k respectively abut on tips of the second tab section 26b, the third tab section 26c, the fifth tab section 26e, and the sixth tab section 26f. Furthermore, the presser 314 of the second actuator 302b abuts on an outer edge between the first tab section 26a and the second tab section 26b, and the presser 314 of the fourth actuator 302d abuts on an outer edge between the second tab section 26b and the third tab section 26c. Similarly, the pressers 314 of the sixth actuator 302f, the eighth actuator 302h, the tenth actuator 302j, and the twelfth actuator 302l respectively abut on each of outer edges between the third tab section 26c and the fourth tab section 26d, between the fourth tab section 26d and the fifth tab section 26e, between the fifth tab section 26e and the sixth tab section 26f, and between the sixth tab section 26f and the first tab section 26a.

As may be understood from this, the first through twelfth actuators 302a-302l are positioner displacing means that displace the engager 310, the sub-engager 312, and the pressers 314 being the positioners. Note that the first actuator 302a and the seventh actuator 302g are also respectively an engager displacing unit and a sub-engager displacing unit.

Note that each of the pressers 314 is also applied with a driving force from the servomotor 304, similarly to the engager 310 and the sub-engager 312. This driving force is smaller compared to the driving force on the engager 310 or the driving force on the sub-engager 312.

Upper surfaces of the driving slider 400, the first driven slider 402, and the second driven slider 404 are each provided with the bracket 64. The bracket 64 is configured so as to project further toward an outer periphery of the stator core 20 than the driving slider 400, the first driven slider 402, and the second driven slider 404 do, and is coupled to the driving slider 400, the first driven slider 402, or the second driven slider 404 via a coupling bolt 66 and a coupling pin 68.

A tip projecting to a stator core 20 side, of the bracket 64 has two stepped holes 70 formed therein on its lower surface side, and has two mounting holes 72 formed therein on its upper surface side. The two stepped holes 70 are positioned on an inner peripheral side and an outer peripheral side in the diametric direction of the annular section 24, and the two mounting holes 72 are in line with each of the stepped holes 70. A short head section of a guide rod 74 is inserted in the mounting hole 72. A flange section 76 of even larger diameter than the head section is formed in the guide rod 74, and this flange section 76 is checked by a vicinity of an opening of the mounting hole 72.

Moreover, a female thread section is formed in the head section of the guide rod 74, and a male thread section of a skirted bolt 78 passed from the stepped hole 70 is screwed into the female thread section. As a result, the guide rod 74 is positioned and fixed in the mounting hole 72. A stepped section of the stepped hole 70 represents a stopper of a head section of the skirted bolt 78.

A threading hole 80 having a female thread section formed on its inner peripheral wall is further carved into the bracket 64 between the mounting holes 72. A male thread section of a guide bolt 82 is screwed into the threading hole 80. The support block 90 (a supporting body) undergoes so-called floating support on the bracket 64, via this guide bolt 82 and the previously described guide rod 74.

Figure 7:
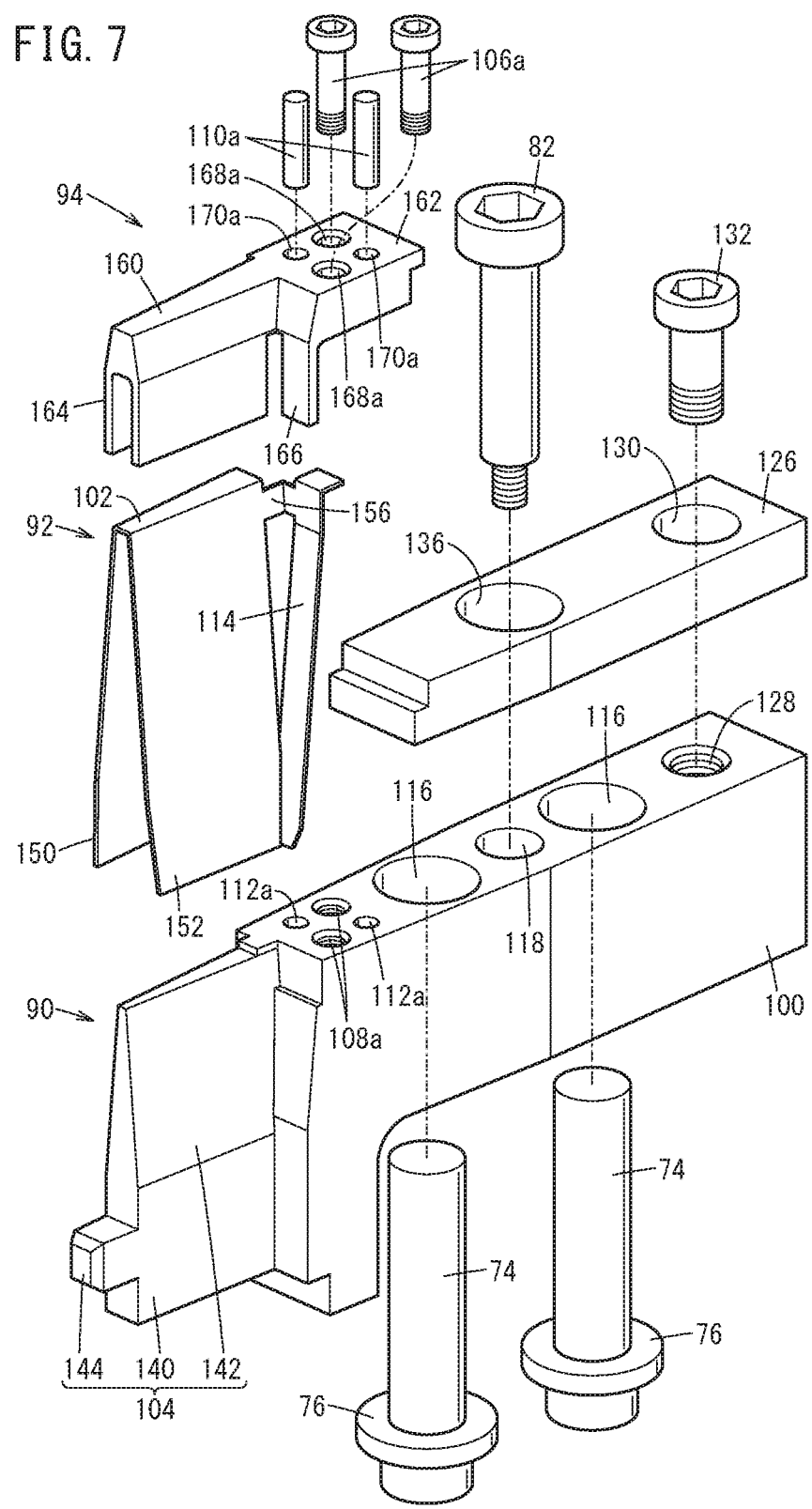
FIG. 7 is a schematic exploded perspective view showing a support block being a supporting body, a three-way guide member being a guide member, and an outer cap member for holding the three-way guide member in the support block.

FIG. 7 is a schematic exploded perspective view showing the support block 90, a three-way guide member 92 (a guide member), and an outer cap member 94. First describing the support block 90, the support block 90 includes: a block main body section 100; and a bent section placement section 104 for placing a bent section 102 configuring the three-way guide member 92. The block main body section 100 of these extends along the diametric direction of the annular section 24. Moreover, as shown in FIG. 7, an upper surface of an end section on an inner peripheral side coming close to the stator core 20, of the block main body section 100 has formed therein: a bolt fastening hole 108a into which a fastening bolt 106a is screwed; and a pin fitting hole 112a in which a positioning pin 110a is fitted. The bolt fastening hole 108a and the pin fitting hole 112a are in a so-called staggered arrangement.

An upper surface of an end section on a side coming close to the stator core 20, of the block main body section 100 has placed thereon a later-mentioned second-short-side side guide section 114 (an outer-peripheral-direction-side side guide section) of the three-way guide member 92. That is, the block main body section 100 serves as an outer-peripheral-direction-side side guide section placement section. A slight clearance (an escape space) is formed between the second-short-side side guide section 114 and a lower end of the block main body section 100.

The block main body section 100 has the following further formed therein, so as to be arranged in a line along a longitudinal direction of the block main body section 100 (the diametric direction of the annular section 24), namely: two rod insertion holes 116 extending along a height direction to each be inserted with the guide rod 74; and a bolt insertion hole 118 through which the guide bolt 82 is passed. Of course, the two rod insertion holes 116 are in positions sandwiching the bolt insertion hole 118. As may be understood from FIG. 4, the two rod insertion holes 116 are each a stepped through-hole of which an inner diameter of a lower end is small and an inner diameter of a greater part other than the lower end is large, and the bolt insertion hole 118 is a stepped through-hole of which an inner diameter of an upper end is small and an inner diameter of a greater part other than the upper end is large.

A sleeve 120 is inserted in the rod insertion hole 116. The sleeve 120 is supported by a stepped section formed based on an inner diameter difference of the rod insertion hole 116. Moreover, a slide guide 122 is sandwiched by the sleeve 120 and the guide rod 74. The slide guide 122 serves to smoothly promote relative ascent or descent of the guide rod 74 with respect to the slide guide 122.

On the other hand, a coil spring 124 as an elastic member is inserted in the bolt insertion hole 118. The guide bolt 82 is passed into an inside of the coil spring 124. Note that a lower end of the coil spring 124 is seated on a vicinity of an opening of the threading hole 80, in an upper surface of the bracket 64. Moreover, an upper end of the coil spring 124 abuts on a stepped section formed based on an inner diameter difference of the bolt insertion hole 118.

An upper end of the guide rod 74 slightly projects from the rod insertion hole 116. Similarly, an upper end (a head section) of the guide bolt 82 slightly projects from the bolt insertion hole 118. A head cover 126 in which the thus projecting upper ends are embedded, is coupled to the block main body section 100. That is, a support hole 128 and a support hole 130 are respectively formed in vicinities of outer peripheral side end sections of the block main body section 100 and the head cover 126. A male thread section of a support bolt 132 passed into the support hole 128 is screwed into a female thread section formed in an inner peripheral wall of the support hole 130, whereby the head cover 126 is positioned and fixed with respect to the block main body section 100.

Two rod receiving holes 134 and a bolt entry hole 136 are formed in a lower surface of the head cover 126. The upper end of the guide rod 74 is covered by the rod receiving hole 134, and the head section of the guide bolt 82 is inserted in the bolt entry hole 136. Note that when the support block 90 ascends with respect to the driving slider 400, the first driven slider 402, or the second driven slider 404, the upper surface of the guide rod 74 is sufficiently separated from a ceiling surface of the rod receiving hole 134.

The bent section placement section 104 is formed on an end surface on an inner peripheral side facing the annular section 24, of the block main body section 100, so as to project toward the annular section 24. As shown in FIG. 7, the bent section placement section 104 includes: a uniformly-wide section 140 whose width along a circumferential direction of the annular section 24 is substantially constant and that has substantially a rectangular parallelepiped shape; and an increasingly-opening section 142 of substantially triangular columnar shape that widens as its lower end is moved toward from its upper end. An engagement projection 144 (a second engaging section) oriented toward the annular section 24 is formed in a projecting manner in the uniformly-wide section 140.

Figure 8:
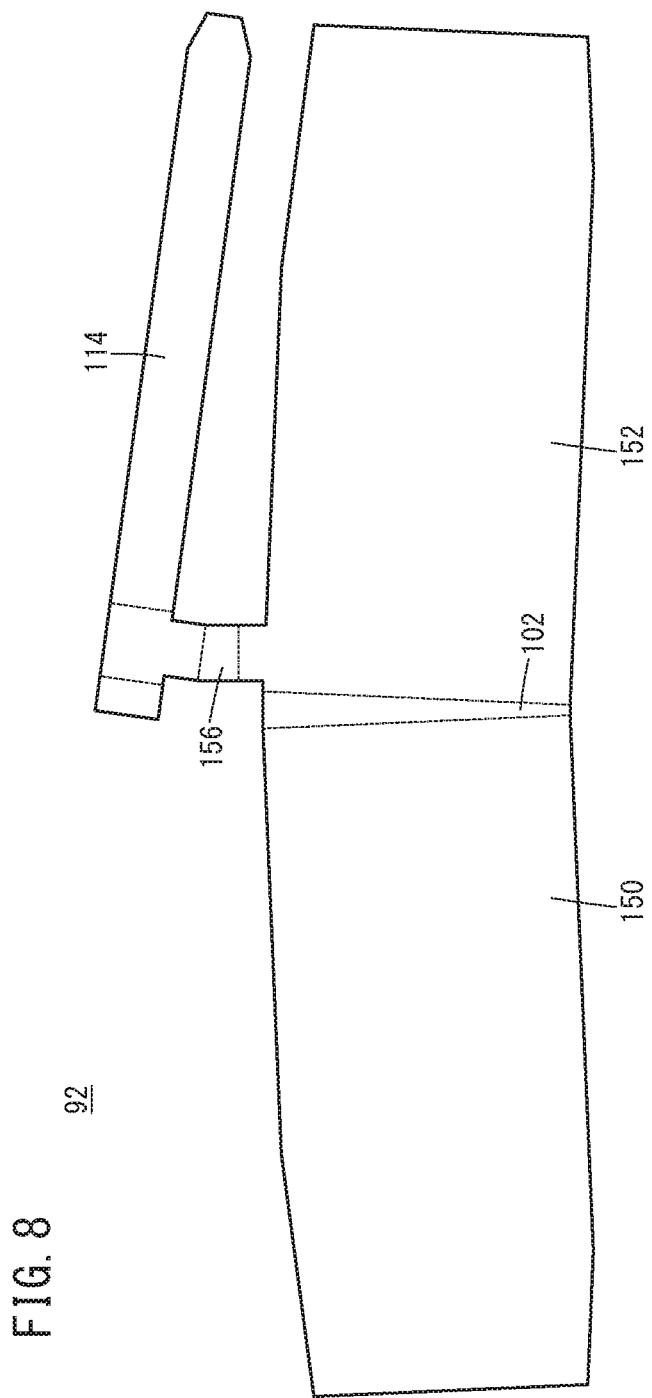
FIG. 8 is a development view of the three-way guide member.

The three-way guide member 92 (the guide member) whose development view is shown in FIG. 8 is supported by the bent section placement section 104. As may be understood from FIGS. 7 and 8, the three-way guide member 92 is configured from a single member integrally provided with: a first-long-side side guide section 150 (a first-diametric-direction-side side guide section); a second-long-side side guide section 152 (a second-diametric-direction-side side guide section); and the second-short-side side guide section 114. The first-long-side side guide section 150 and the second-long-side side guide section 152 are provided by being bent in such a manner that substantially rectangular shaped large tongue piece sections thereof are at a certain angle, preferably an angle slightly larger than an intersection angle of inclined surfaces of the increasingly-opening section 142.

Figure 9:
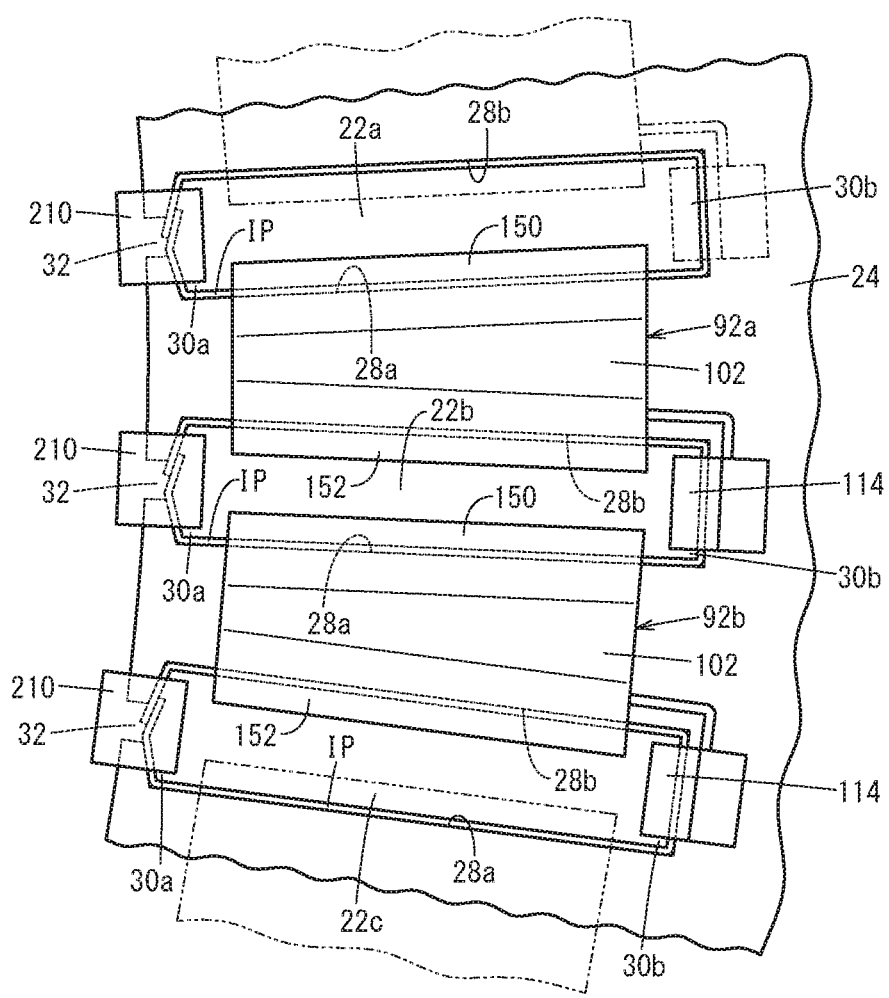
FIG. 9 is a principal part enlarged plan view showing schematically a state where a first-long-side side guide section, a second-long-side side guide section, and a second-short-side side guide section of the three-way guide member have come close to the slot.

The first-long-side side guide section 150 and the second-long-side side guide section 152 of one three-way guide member 92 come close to separate slots 22, as shown in FIG. 9. For convenience, any three slots 22 arranged in line along a circumferential direction, of the plurality of slots 22 will be assumed to be a first slot 22*a*, a second slot 22*b*, and a third slot 22*c*, and any two three-way guide members 92 adjacent along the circumferential direction will be assumed to be a first three-way guide member 92*a* and a second three-way guide member 92*b*. The first-long-side side guide section 150 of the first three-way guide member 92*a* comes close to the first slot 22*a* from a first long side 28*a* side of the first slot 22*a*, and the second-long-side side guide section 152 of the first three-way guide member 92*a* comes close to the second slot 22*b* from a second long side 28*b* side of the second slot 22*b*. Furthermore, coming close to the second slot 22*b* from a first long side 28*a* side of the second slot 22*b* is the first-long-side side guide section 150 of the second three-way guide member 92*b*. The second-long-side side guide section 152 of this second three-way guide member 92*b* comes close to the third slot 22*c* from a second long side 28*b* side of the third slot 22*c*.

As indicated above, the first long side 28*a* and the second long side 28*b* of the same slot 22 are respectively faced by the first-long-side side guide section 150 and the second-long-side side guide section 152 of separate three-way guide members 92 adjacent to each other. In other words, the first-long-side side guide section 150 and the second-long-side side guide section 152 of one three-way guide member 92 respectively come close to slots 22 adjacent to each other.

The second-short-side side guide section 114 is coupled to the second-long-side side guide section 152 via a slightly inclined bridging section 156. The second-short-side side guide section 114 extends in two substantially orthogonal directions from a coupling place with the bridging section 156. A short extending region is bent along an upper surface from a tip surface in an inner peripheral direction of the block main body section 100, and, as well as being placed on the upper surface, is sandwiched by the upper surface and the outer cap member 94. On the other hand, a long extending region comes close to the same slot 22 as the second-long-side side guide section 152. In the case of the above-described example, the second-short-side side guide section 114 of the second three-way guide member 92*b*, along with the second-long-side side guide section 152 of the second three-way guide member 92*b*, comes close to the second slot 22*b*.

The first-long-side side guide section 150 inclines in a direction of separating from the second slot 22*b* as a lower side of the first slot 22a is moved toward. Moreover, the second-long-side side guide section 152 inclines in a direction of approaching the third slot 22c as a lower side of the second slot 22b is moved toward. Furthermore, the second-short-side side guide section 114 inclines so as to come closer to a first short side 30a side as a lower side is moved toward.

The three-way guide member 92 configured in this way has its first-long-side side guide section 150 and its second-long-side side guide section 152 disposed along an inclined surface of the increasingly-opening section 142 being a part of the support block 90, and has its bent section 102 placed on a top section (an intersecting section of inclined surfaces) of the increasingly-opening section 142.

The three-way guide member 92 supported by the support block 90 as indicated above is covered by the outer cap member 94. The outer cap member 94 is configured from a single member that integrally includes: a bent section sandwiching section 160; and a second-short-side side guide section sandwiching section 162 (an outer-peripheral-direction-side side guide section sandwiching section).

The bent section sandwiching section 160 projects oriented in an inner peripheral direction from a tip on an inner peripheral side of the second-short-side side guide section sandwiching section 162, and is provided with an insertion groove 164 whose lower side opens so that it has substantially an inverted U shape. Two side walls partitioning the insertion groove 164 sandwich the first-long-side side guide section 150 and the second-long-side side guide section 152. In the case where an intersection angle of the first-long-side side guide section 150 and the second-long-side side guide section 152 (a bending angle of the bent section 102) is larger than the intersection angle of the inclined surfaces of the increasingly-opening section 142, the first-long-side side guide section 150 and the second-long-side side guide section 152 are pressed by the two side walls in the insertion groove 164 and corrected so as to conform to the increasingly-opening section 142 when the first-long-side side guide section 150 and the second-long-side side guide section 152 are inserted in the insertion groove 164.

The tip on an inner peripheral side of the second-short-side side guide section sandwiching section 162 is provided with a checking plate section 166 that is adjacent to the bent section sandwiching section 160 and extends downwardly. The checking plate section 166 presses an upper side of the second-short-side side guide section 114 to a side of a tip surface on an inner peripheral side of the block main body section 100 configuring the support block 90.

Moreover, the second-short-side side guide section sandwiching section 162 sandwiches the short extending region bent along the upper surface from the tip surface in an inner peripheral direction of the block main body section 100, of the second-short-side side guide section 114, along with the upper surface. As a result, the three-way guide member 92 is stably supported by the support block 90 on both the first long side 28a and second long side 28b side and the second short side 30b side in the slot 22.

A bolt checking hole 168a and a pin insertion hole 170a penetrate the second-short-side side guide section sandwiching section 162 along an up-down direction being a thickness direction. The bolt checking hole 168a is a stepped through-hole of which an inner diameter on a lower side is small and an inner diameter on an upper side is large, and that, as well as having a stepped section formed by an inner diameter difference, overlaps the bolt fastening hole 108a to be in line with the bolt fastening hole 108a. On the other hand, an inner diameter of the pin insertion hole 170a overlapping the pin fitting hole 112a to be in line with the pin fitting hole 112a, is substantially constant.

The positioning pin 110a is passed into the pin insertion hole 170a to be fitted in the pin fitting hole 112a, and represents a whirl-stop of the outer cap member 94. Moreover, the fastening bolt 106a is passed into the bolt checking hole 168a to be screwed into the bolt fastening hole 108a, and fastens the outer cap member 94 to the block main body section 100. The head section of the fastening bolt 106a is checked by the stepped section in the bolt checking hole 168a.

Two each of assemblies each configured by the support block 90, the three-way guide member 92, and the outer cap member 94, are supported by each of the driving slider 400, the first driven slider 402, and the second driven slider 404. In other words, the first slider unit 406a holds six assemblies. The same applies also to the remaining second through twelfth slider units 406b-406l.

As described above, the assembly (the support block 90, the three-way guide member 92, and the outer cap member 94) is supported by the driving slider 400, the first driven slider 402, or the second driven slider 404, via the bracket 64. Hence, as all of the guide shafts 306 synchronously advance to an inner peripheral side of the stator core 20, each of the assemblies proceeds to the inner peripheral side integrally with the driving slider 400, the first driven slider 402, or the second driven slider 404. That is, the three-way guide members 92 congregate. Contrarily, as all of the guide shafts 306 synchronously retract to an outer peripheral side, the assemblies integrally withdraw to the outer peripheral side, and the three-way guide members 92 radially disperse.

Figure 10:
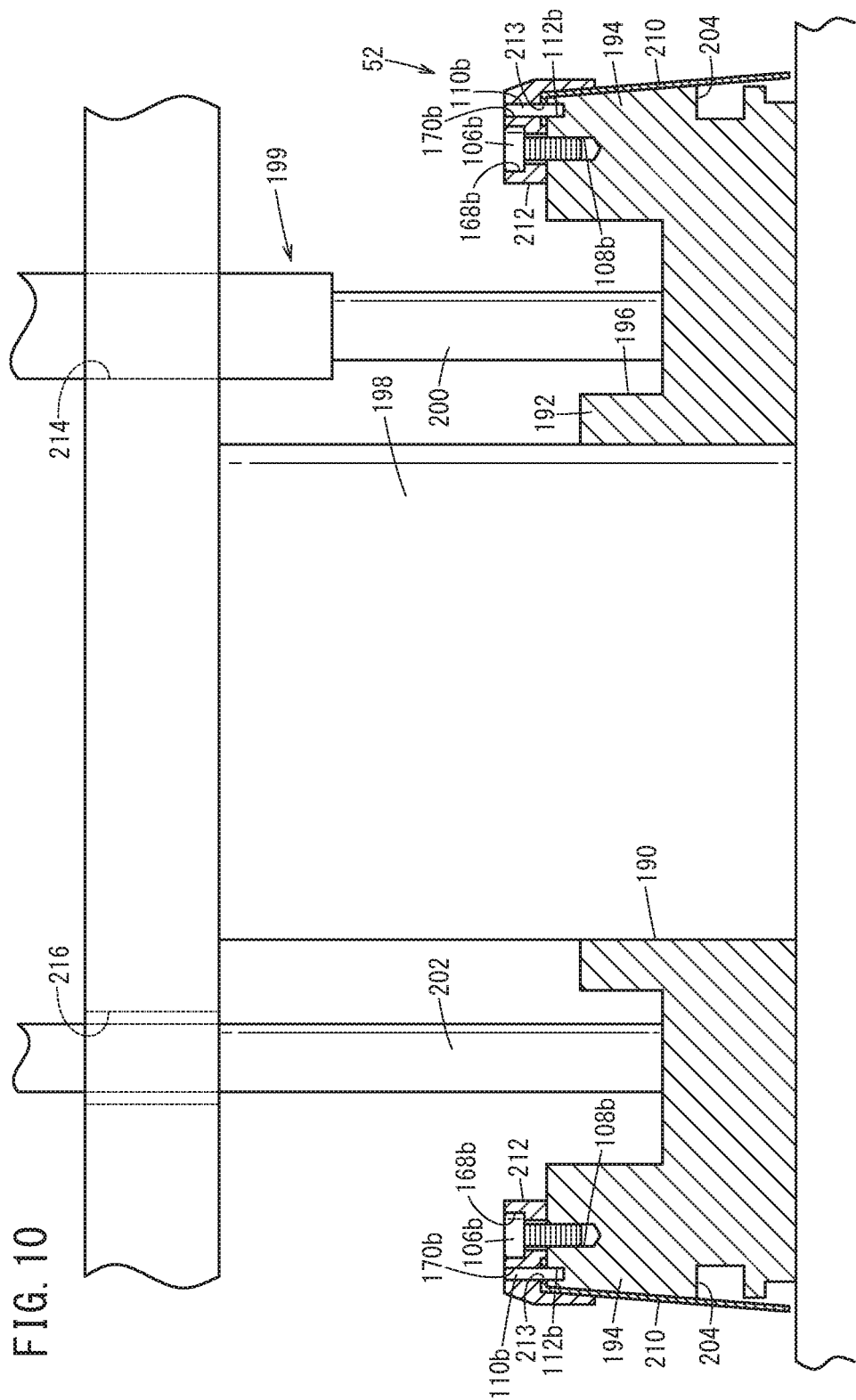
FIG. 10 is a principal part side cross-sectional view of the inner peripheral side guide section.

As shown in FIG. 10, the inner peripheral side guide section 52 has an annular shape due to a receiving hole 190 being formed in its center, and includes: an inner circling wall section 192 that circles rising up at an inner peripheral edge section; and an outer circling wall section 194 that circles rising up at an outer peripheral edge section. Formed between the inner circling wall section 192 and the outer circling wall section 194 is an annular recess 196 that is sunken relatively to these.

The receiving hole 190 is entered into by an entering shaft section 198 that configures a gripping mechanism for gripping the segment 10 and is capable of ascending/descending. That is, the entering shaft section 198 enters into the receiving hole 190 as the gripping mechanism descends, while it withdraws from the receiving hole 190 as the gripping mechanism ascends.

A lower end of a raising/lowering-oriented rod 200 configuring a raising/lowering-oriented cylinder 199, is coupled to the annular recess 196 (refer to FIG. 4). The inner peripheral side guide section 52 ascends following ascent (retraction) of the raising/lowering-oriented rod 200, and descends following descent (advancement) of the raising/lowering-oriented rod 200. Moreover, a guide bar 202 is inserted in a penetrating manner in a position representing a phase difference with the raising/lowering-oriented rod 200 of substantially 180°, of the annular recess 196. A lower end of the guide bar 202 is coupled to an unillustrated support stand provided below the inner peripheral side guide section 52 in the leg inserting apparatus.

An engagement recess 204 (a first engaging section) is formed in a side peripheral wall of the outer circling wall section 194, that is, an outer peripheral wall of the inner peripheral side guide section 52. As will be mentioned later, the engagement projection 144 provided in the support block 90 engages with the engagement recess 204.

A one-way guide member 210 (an inner-peripheral-direction-side side guide section) functioning as a first-short-side side guide section is positioned and fixed in the outer circling wall section 194, via an inner cap member 212 (an inner-peripheral-direction-side side guide section sandwiching section). That is, two bolt fastening holes 108b and pin fitting holes 112b are formed in a staggered arrangement in an upper surface of the outer circling wall section 194. Moreover, a pin passage hole 213 passes in a penetrating manner through the one-way guide member 210. Furthermore, a bolt checking hole 168b being a stepped throughhole, and a pin insertion hole 170b whose inner diameter is substantially constant, pass in a penetrating manner through the inner cap member 212, similarly to the bolt checking hole 168a and the pin insertion hole 170a. Whirl-stop of the inner cap member 212 and the one-way guide member 210 is performed by a positioning pin 110b that has passed through the pin insertion hole 170b and the pin passage hole 213 to be fitted into the pin fitting hole 112b.

Moreover, the inner cap member 212 is coupled to the outer circling wall section 194 by a fastening bolt 106b that has passed through the bolt checking hole 168b to be screwed into the bolt fastening hole 108b. A head section of the fastening bolt 106b is checked by a stepped section in the bolt checking hole 168b.

The one-way guide member 210 inclines so as to come closer to the inner peripheral side of the stator core 20 as an upper side is move toward from a lower side. This one-way guide member 210 is configured so as to have a slight clearance (an escape space) formed between it and a lower end of the outer circling wall section 194, and faces the second-short-side side guide section 114 of the three-way guide member 92.

The gripping mechanism includes: a disk-shaped clamp section (not illustrated); and the entering shaft section 198 that extends projecting downwardly from a center of the clamp section. The clamp section grips the segment 10 with a posture of its legs 12 facing downwards and its turn section 14 facing upwards. Note that the entering shaft section 198 is passed through in a penetrating manner by a rod insertion hole 214 and a bar insertion hole 216 through which the raising/lowering-oriented rod 200 and the guide bar 202 are individually passed. A phase difference of the rod insertion hole 214 and the bar insertion hole 216 is substantially 180°.

The leg inserting apparatus including the positioning and fixing apparatus 300 according to the present embodiment is basically configured as above, and, next, operational advantages of the positioning and fixing apparatus 300 will be described in relation to a method of positioning and fixing of the stator core 20 implemented by manufacturing steps of the stator ST. Note that, unless otherwise specifically indicated, an operation or work below is performed under controlling action of an unillustrated control circuit.

In order to obtain the stator ST, an operator first holds the stator core 20 that has had an insulating paper IP inserted beforehand in the slots 22, in a certain place of the leg inserting apparatus. The stator core 20 is then raised, and conveyed to a certain section provided with the inner peripheral side guide section 52. At this time point, as shown in FIG. 4, the stator core 20 is positioned relatively more downwardly than the inner peripheral side guide section 52 is. Hence, the one-way guide member 210 is positioned above the slots 22.

Meanwhile, the clamp section configuring the gripping mechanism grips the segment 10 in a posture of its legs 12 facing downwards and its turn section 14 facing upwards, and moves to above the stator core 20. At this time, the legs 12 are positioned above the slots 22. Moreover, the first through twelfth slider units 406a-406l are standing by on an outer peripheral side of the stator core 20.

Figure 11:
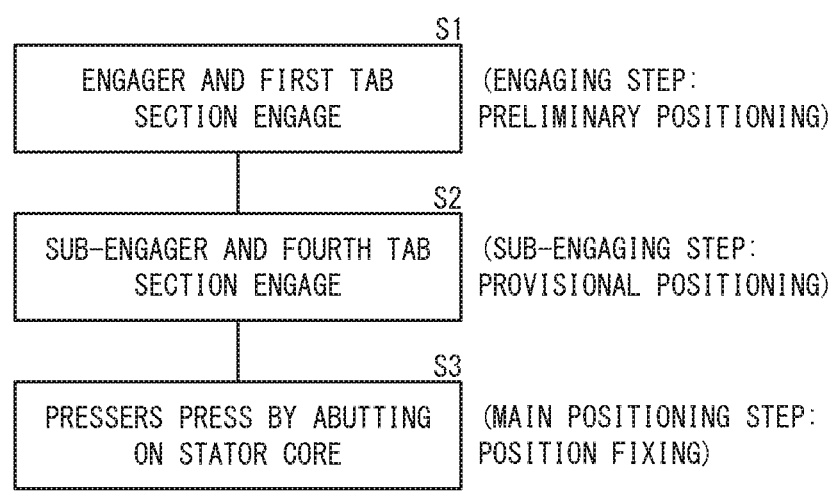
FIG. 11 is a schematic flow of a method of positioning and fixing according to the embodiment of the present invention.

Next, a method of positioning and fixing of the stator core 20 according to the present embodiment whose schematic flow is shown in FIG. 11, is implemented. In this case, the method of positioning and fixing includes an engaging step S1, a sub-engaging step S2, and a main positioning step S3.

Figure 12:
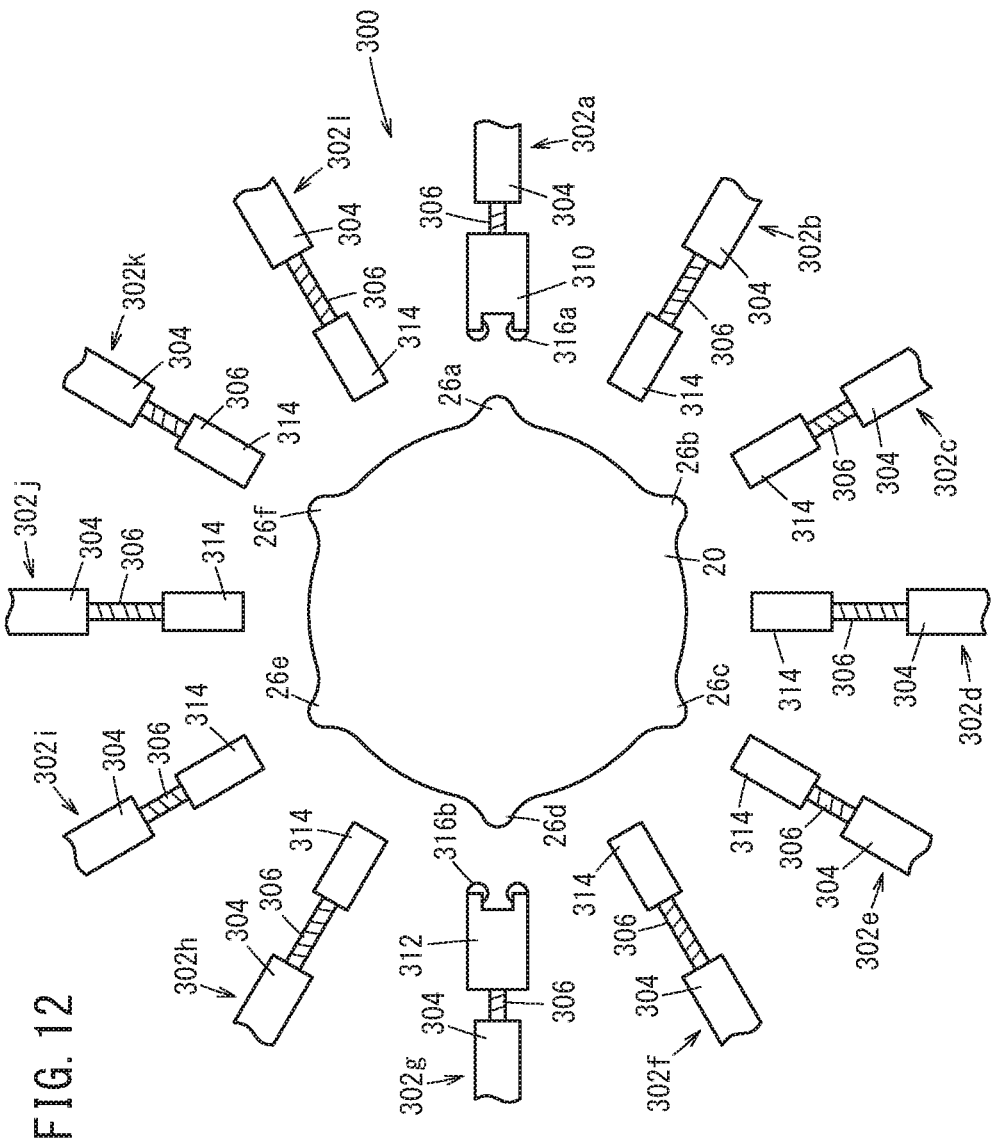
FIG. 12 is a schematic plan view showing a state where all of the engager, a sub-engager, and pressers (positioners) are separated from the stator core.

First, in order to perform the engaging step S1, the servomotors 304 configuring the first through twelfth actuators 302a-302l are simultaneously energized, from a state shown schematically in FIG. 12. As a result, each of the guide shafts 306 of the first through twelfth actuators 302a-302l rotate, and, as a result, the engager 310, the sub-engager 312, and the pressers 314 (all of which are positioners) advance at substantially equal speeds toward the stator core 20.

Figure 13:
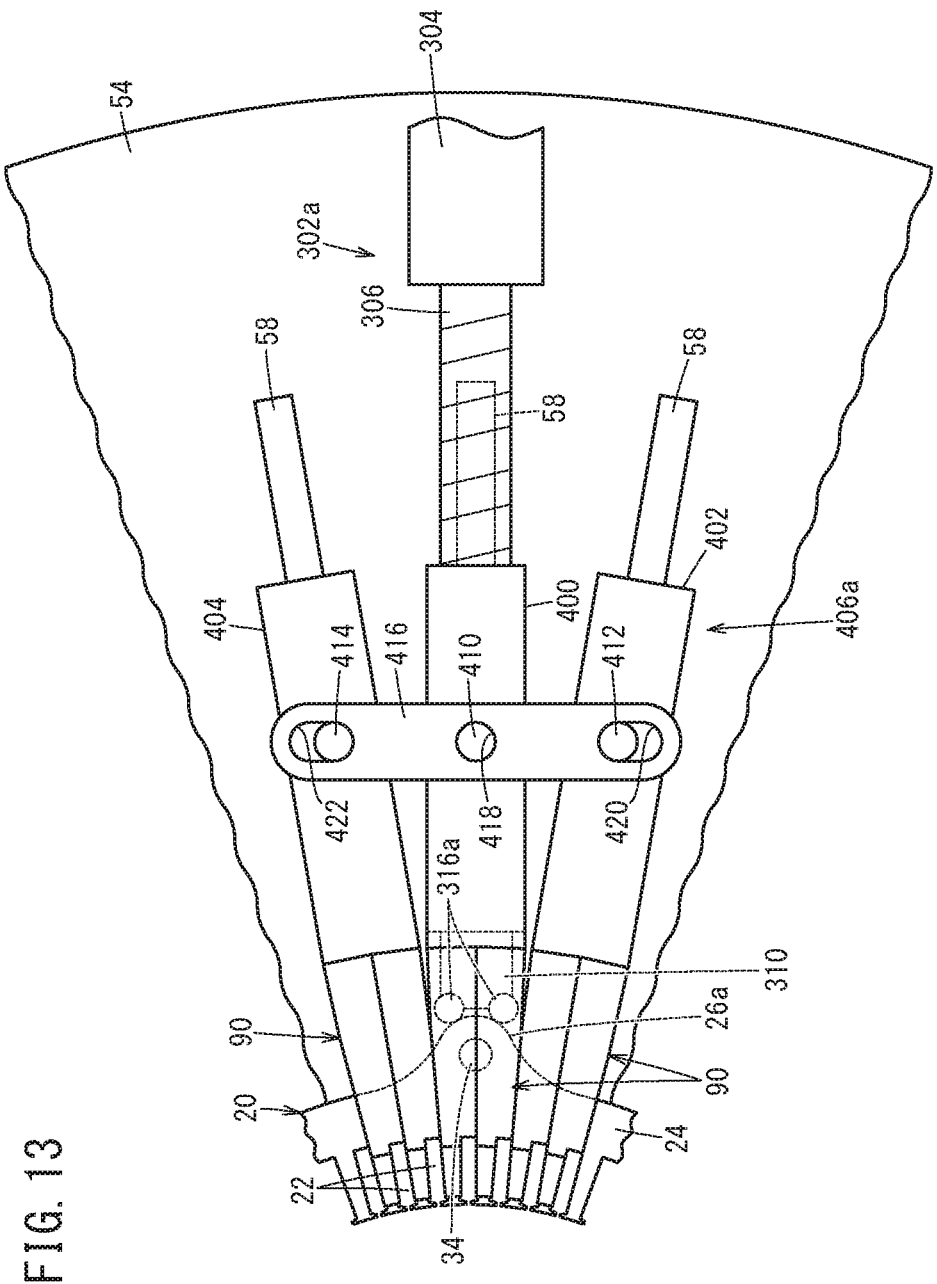
FIG. 13 is a principal part schematic plan view showing a state where from FIG. 5, the driving slider, the first driven slider, and the second driven slider have been displaced toward an inner peripheral side of the stator core.

More specifically, the driving slider 400 configuring the slider unit has the first driven slider 402 and the second driven slider 404 coupled to it via the link member 416. Hence, as the driving slider 400 advances, the first driven slider 402 and the second driven slider 404 also advance toward the stator core 20. At this time, as shown in FIG. 13, the first displacement assisting cam follower 412 and the second displacement assisting cam follower 414 move to a driving slider 400 side along insides of the first long hole 420 and the second long hole 422. It is therefore possible for the first driven slider 402 and the second driven slider 404 to advance along with the driving slider 400. When the driving slider 400, the first driven slider 402, and the second driven slider 404 advance, the sliding body 60 slides along a top of the guide rail 58.

When a separation distance between the engager 310, sub-engager 312, and pressers 314, and the stator core 20 decreases to a certain value, speeds of the sub-engager 312 and the pressers 314 are reduced. A reduction amount of the speed is smaller for the sub-engager 312. In other words, the sub-engager 312 is displaced toward the stator core 20 at a slightly higher speed compared to the pressers 314. Note that at this time point, the sub-engager 312 and the pressers 314 may be configured set to equal speeds. Alternatively, it is also possible to configure so that the sub-engager 312 and the pressers 314 are stopped.

Figure 14:
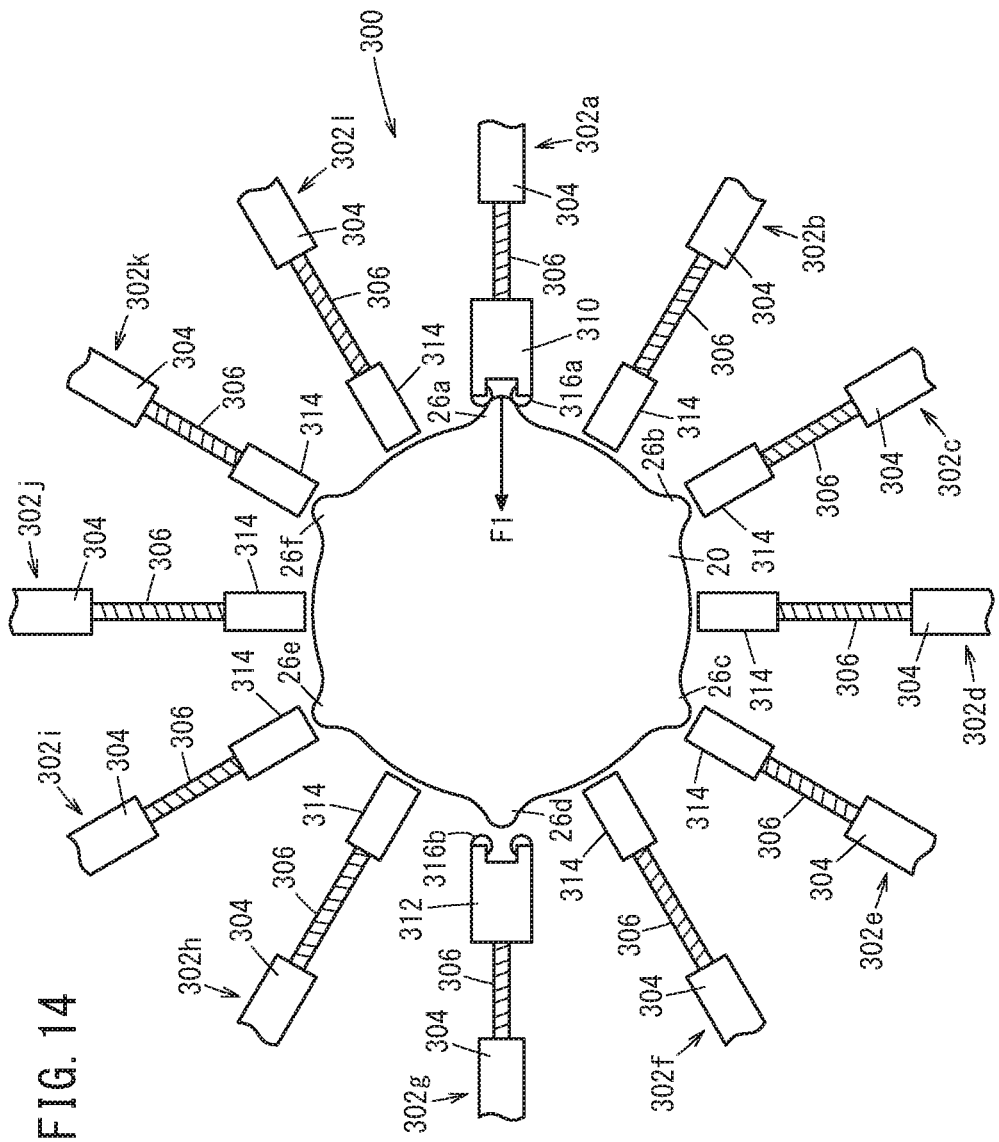
FIG. 14 is a schematic plan view showing a state where from FIG. 12, the engager only has advanced ahead to abut on the first tab section.

On the other hand, a speed of the engager 310 is maintained. Hence, as shown in FIG. 14, the engager 310 reaches the stator core 20 first.

The engager 310 is provided with the pair of aligning cam followers 316a (refer to FIG. 6). Therefore, even if some positional misalignment has occurred between the first tab section 26a and the engager 310 as shown by the imaginary line in FIG. 6, the aligning cam followers 316a abut on an outer wall of the first tab section 26a, then further advance, thereby pressing the first tab section 26a. This pressing causes the posture or phase of the stator core 20 to be corrected via the first tab section 26a. As a result, the first tab section 26a enters (engages) between the paired aligning cam followers 316a, whereby positioning of the first tab section 26a is performed by the aligning cam followers 316a.

Even after this, since energization of the servomotor 304 of the first actuator 302a is continued, a driving force for advancing in a direction of the stator core 20 acts on the engager 310. Hence, the pressing force F1 oriented from the engager 310 to the inner peripheral side (a sub-engager 312 side) of the stator core 20, is applied to the stator core 20. Since the pressing force F1 is not large enough to overcome a weight of the stator core 20 to push out the stator core 20, the stator core 20 that has received the pressing force F1 from the engager 310 is never displaced to the sub-engager 312 side, or in another direction.

On the other hand, even if some kind of external force acts on the stator core 20, the stator core 20 is prevented from being pushed forward toward the engager 310 side (a first actuator 302a side) since the first tab section 26a is being applied with the pressing force F1 from the engager 310. That is, due to engagement of the engager 310 and the first tab section 26a, the stator core 20 is preliminarily positioned.

Next, the sub-engaging step S2 is performed. When the sub-engager 312 and the pressers 314 have had their speeds reduced so as to be equal, the servomotor 304 of the seventh actuator 302g should be controlled and a rotational speed of the guide shaft 306 of the seventh actuator 302g slightly increased to raise the speed of the sub-engager 312. Moreover, when the sub-engager 312 and the pressers 314 have been stopped, the servomotor 304 of the seventh actuator 302g only should be re-energized to rotate the guide shaft 306.

Figure 15:
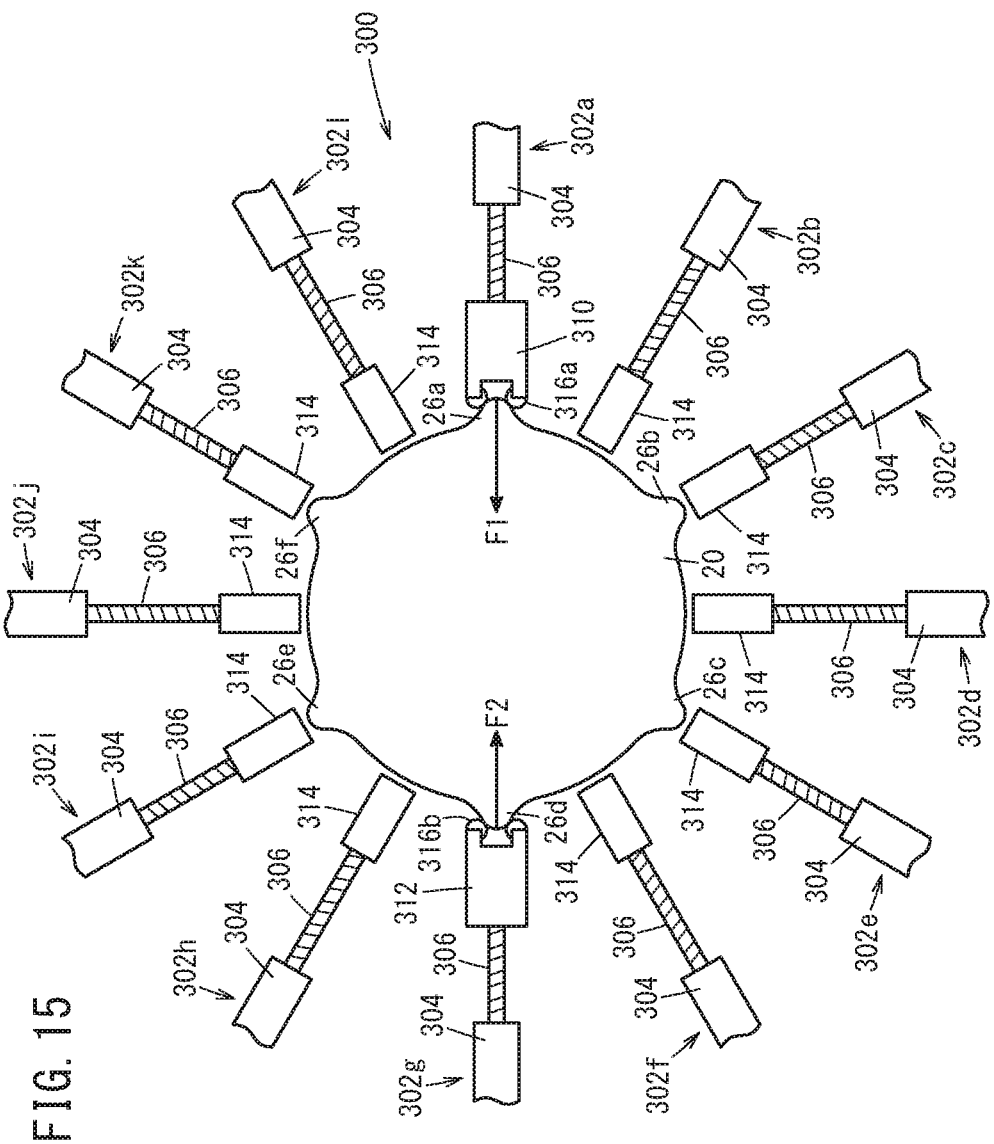
FIG. 15 is a schematic plan view showing a state where from FIG. 14, the sub-engager only has advanced ahead to abut on a fourth tab section.

In either case, the sub-engager 312 is displaced so as to approach the stator core 20 in advance of the pressers 314 and abuts on an outer wall of the fourth tab section 26d, as shown in FIG. 15. Because the sub-engager 312 is provided with the pair of aligning cam followers 316b, even if some positional misalignment of the sub-engager 312 from the fourth tab section 26d has occurred, the aligning cam followers 316b correct the posture of the stator core 20 via the fourth tab section 26d similarly to as described above. Thus, the fourth tab section 26d easily enters between the paired aligning cam followers 316b. That is, the fourth tab section 26d and the sub-engager 312 engage with each other.

Even after this, because energization of the servomotor 304 of the seventh actuator 302g is continued, a driving force for advancing in a direction of the stator core 20 acts on the sub-engager 312. Hence, the pressing force F2 oriented from the sub-engager 312 to the inner peripheral side (the engager 310 side) of the stator core 20, is applied to the stator core 20.

The driving force applied to the sub-engager 312 from the servomotor 304 of the seventh actuator 302g is set smaller compared to the driving force applied to the engager 310 from the servomotor 304 of the first actuator 302a. Hence, the pressing force F2 is smaller compared to the pressing force F1 applied to the stator core 20 via the first tab section 26a from the engager 310. Therefore, the stator core 20 that has received the pressing force F2 from the sub-engager 312 is never displaced to the engager 310 side, or in another direction. That is, by the pressing force F2 being set smaller than the pressing force F1, the stator core 20 is prevented from undergoing positional misalignment when the sub-engager 312 and the fourth tab section 26d engage.

Moreover, since the phase difference of the pressing force F1 and the pressing force F2 is approximately 180°, the stator core 20 achieves a state of being solidly sandwiched by the engager 310 and the sub-engager 312. As a result of this sandwiching, prevention of phase shift, in other words, so-called whirl-stop of the stator core 20 is performed, and the stator core 20 is provisionally positioned and fixed.

Next, the main positioning step S3 is performed. When the pressers 314 have been stopped at a time of performing the engaging step S1, the servomotors 304 of the remaining second through sixth actuators 302b-302f and eighth through twelfth actuators 302h-302l are re-energized, and the pressers 314 re-advance toward the stator core 20.

Figure 16:
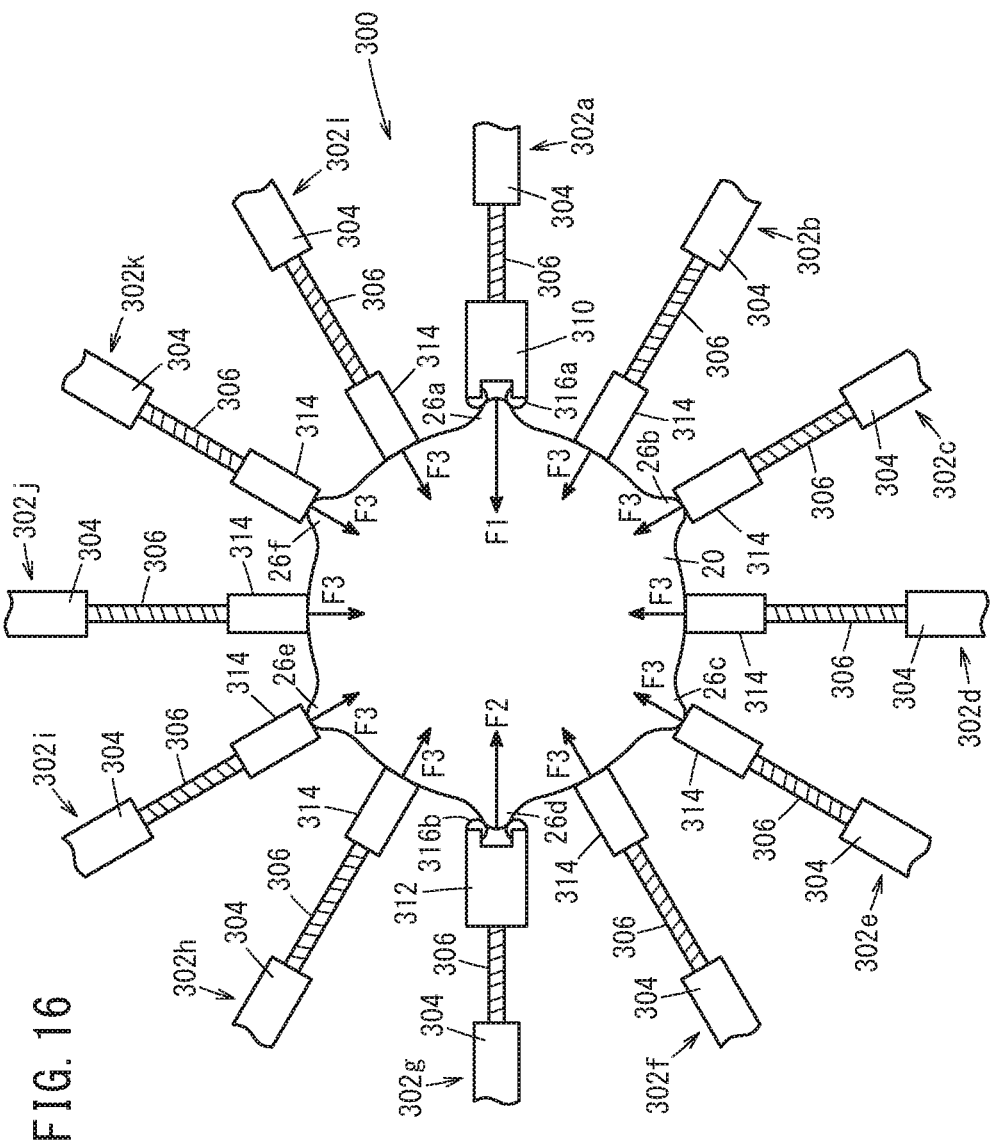
FIG. 16 is a schematic plan view showing a state where from FIG. 15, the remainder of the pressers have advanced to abut on a certain region of the stator core.

Finally, as shown in FIG. 16, the pressers 314 of the third actuator 302c, the fifth actuator 302e, the ninth actuator 302i, and the eleventh actuator 302k respectively abut on the tips of the second tab section 26b, the third tab section 26c, the fifth tab section 26e, and the sixth tab section 26f. Moreover, the pressers 314 of the second actuator 302b, the fourth actuator 302d, the sixth actuator 302f, the eighth actuator 302h, the tenth actuator 302j, and the twelfth actuator 302l respectively abut on each of the outer edges between the first tab section 26a and the second tab section 26b, between the second tab section 26b and the third tab section 26c, between the third tab section 26c and the fourth tab section 26d, between the fourth tab section 26d and the fifth tab section 26e, between the fifth tab section 26e and the sixth tab section 26f, and between the sixth tab section 26f and the first tab section 26a.

In this state, all of the pressers 314 are applied with driving forces from the servomotors 304. Since the pressers 314 resultantly attempt to further advance in a direction of the stator core 20 side, the stator core 20 is pressed by a pressing force F3 oriented toward the inner peripheral side from each of the pressers 314. This pressing causes the stator core 20 to be firmly positioned and fixed. Note that the driving force on the presser 314 is set smaller compared to the driving force on the engager 310 or the driving force on the sub-engager 312. Hence, a relationship of pressing force F1> pressing force F2> pressing force F3 holds. A configuration may be adopted whereby a difference between the pressing force F1 and the pressing force F2 is set to be slight, and a difference between the pressing force F2 and the pressing force F3 is set to be markedly large.

Figure 17:
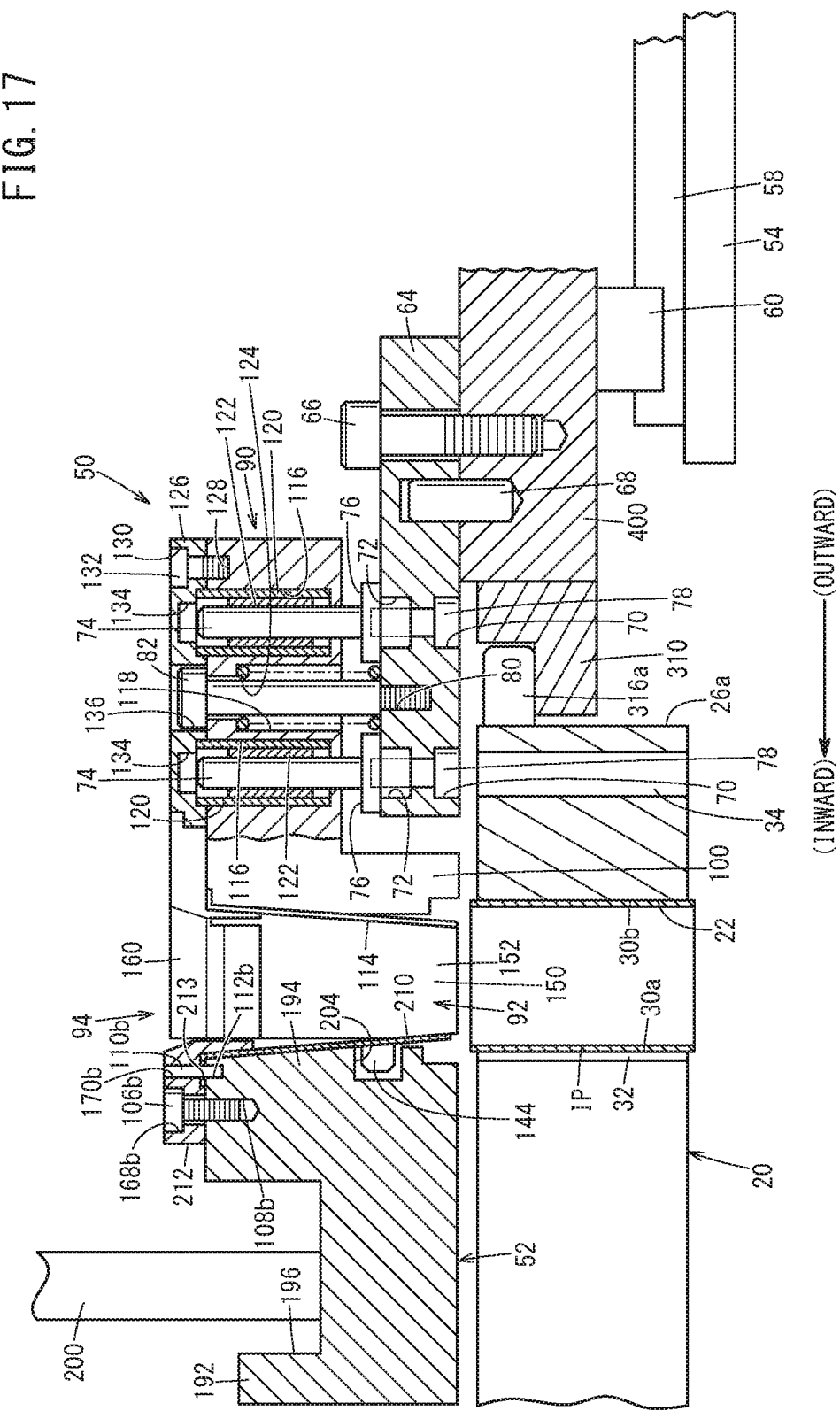
FIG. 17 is a principal part side view showing a state where from FIG. 4, the slider unit included in the outer peripheral side guide section has been displaced toward the inner peripheral side guide section.

Moreover, as the first through twelfth slider units 406a-406l are displaced (advance) toward the stator core 20 as described above, the support block 90, the three-way guide member 92, and the outer cap member 94 are displaced so as to come close to the stator core 20, in other words, so as to congregate on the inner peripheral side of the stator core 20, as shown in FIG. 17. As a result, the engagement projection 144 engages with the engagement recess 204, and the three-way guide member 92 is positioned above the slot 22 in a state of having come close to the one-way guide member 210.

Figure 18:
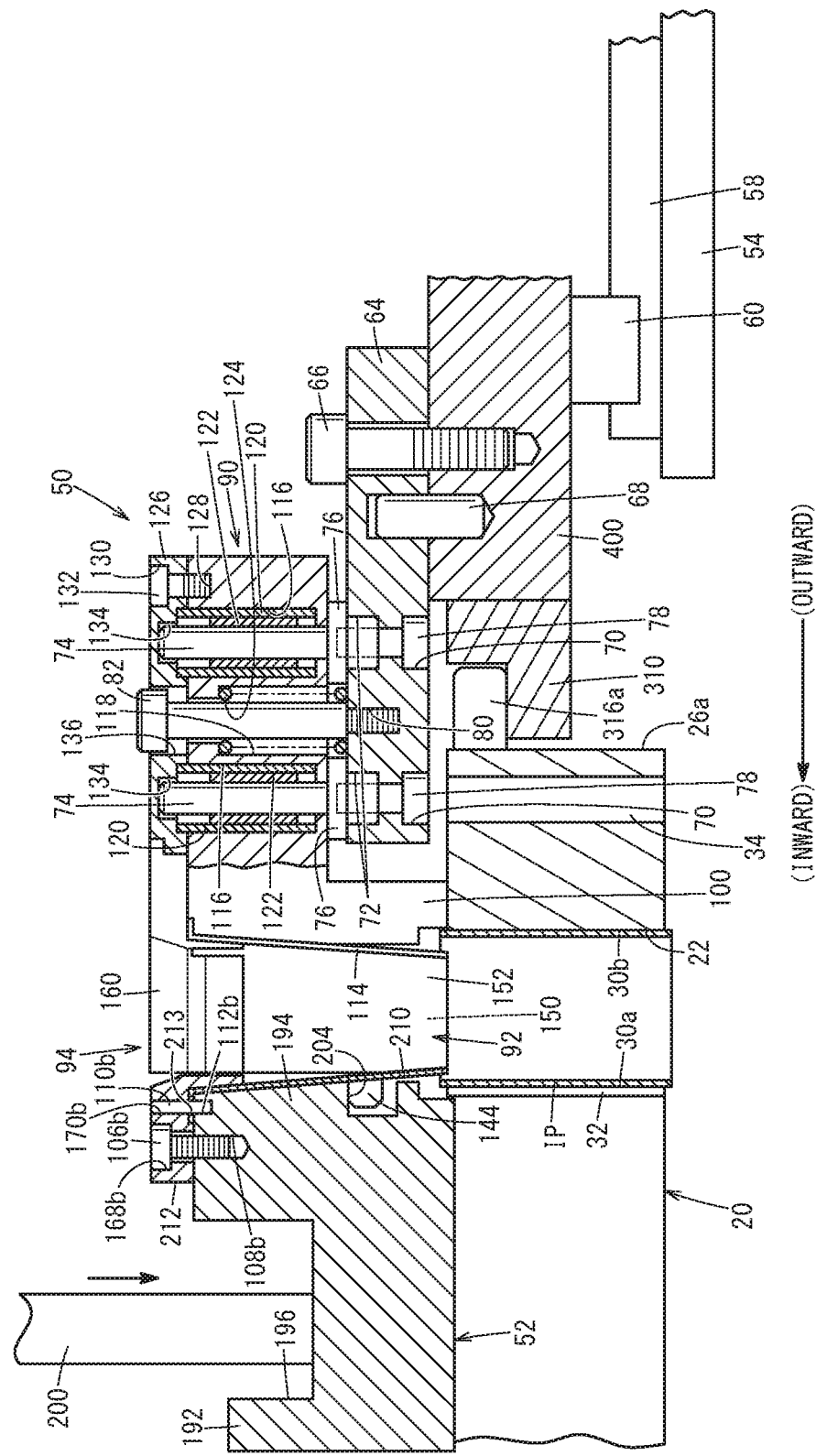
FIG. 18 is a principal part side view showing a state where from FIG. 17, the slider unit and the inner peripheral side guide section have descended whereby a lower end of the three-way guide member comes close to the slot.

After the stator core 20 has been positioned and fixed as above, the legs 12 of the segment 10 are inserted in the slots 22 of the stator core 20. That is, next, as shown in FIG. 18, the raising/lowering-oriented cylinder 199 is energized, whereby the raising/lowering-oriented rod 200 advances (descends). Accordingly, the inner peripheral side guide section 52 descends toward the stator core 20 while being guided by the guide bar 202. Since the engagement projection 144 provided in the support block 90 is engaged with the engagement recess 204 formed in the outer circling wall section 194, the support block 90 descends following the inner peripheral side guide section 52.

When the support block 90 descends, the coil spring 124 contracts along the guide bolt 82. Moreover, the slide guide 122 slides relatively with respect to the guide rod 74. Therefore, the likes of the first through twelfth slider units 406a-406l or the pedestal 54 do not descend, but retain their positions.

As shown in FIG. 9, descent of the support block 90 results in a lower end of the one-way guide member 210 coming close to the first short side 30a on the inner peripheral side, of the slot 22. In the same slot 22, the second-long-side side guide section 152 and the second-short-side side guide section 114 of one three-way guide member 92 (the first three-way guide member 92a) respectively come close to the second long side 28*b* and the second short side 30*b*. The first long side 28*a* of this slot 22 is further come close to by the first-long-side side guide section 150 of a separate three-way guide member 92 (the second three-way guide member 92*b*). Note that the first-long-side side guide section 150 of the three-way guide member 92 comes close to the first long side 28*a* of the slot 22 adjacent on a clockwise upstream side to the slot 22.

An upper end of the insulating paper IP that has been inserted beforehand in the slot 22 is spread out toward each inner wall side of the slot 22 by each of lower ends of the one-way guide member 210, the second-long-side side guide section 152, the second-short-side side guide section 114, and the first-long-side side guide section 150 that have come close to the slot 22. In other words, the upper end of the insulating paper IP is covered by back surfaces of each of the lower ends of the one-way guide member 210, the second-long-side side guide section 152, the second-short-side side guide section 114, and the first-long-side side guide section 150. As a result, the insulating paper IP is positioned and fixed.

Note that within the same slot 22, the more a lower side is moved toward, the more adjacent to each other the one-way guide member 210, the second-long-side side guide section 152, the second-short-side side guide section 114, and the first-long-side side guide section 150 are. That is, an inner space formed by the one-way guide member 210, the second-long-side side guide section 152, the second-short-side side guide section 114, and the first-long-side side guide section 150 contracts as the lower side is moved toward.

Figure 19:
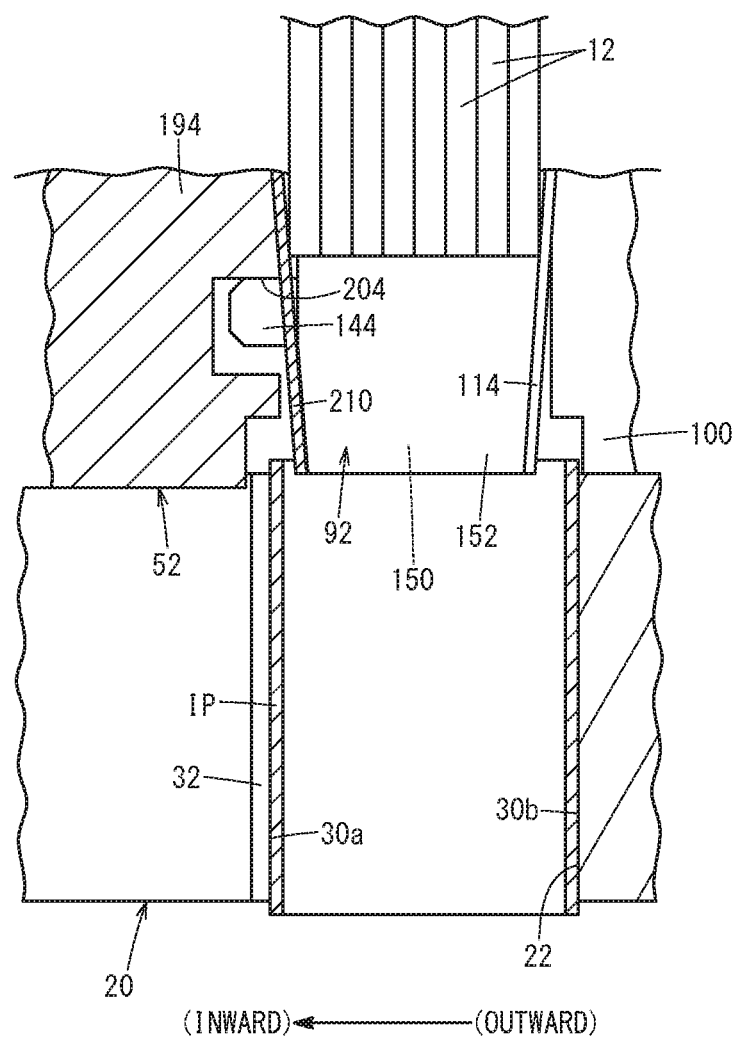
FIG. 19 is a principal part enlarged cross-sectional view showing a state where the legs of the segments advance toward an inside of the slot.
Figure 20:
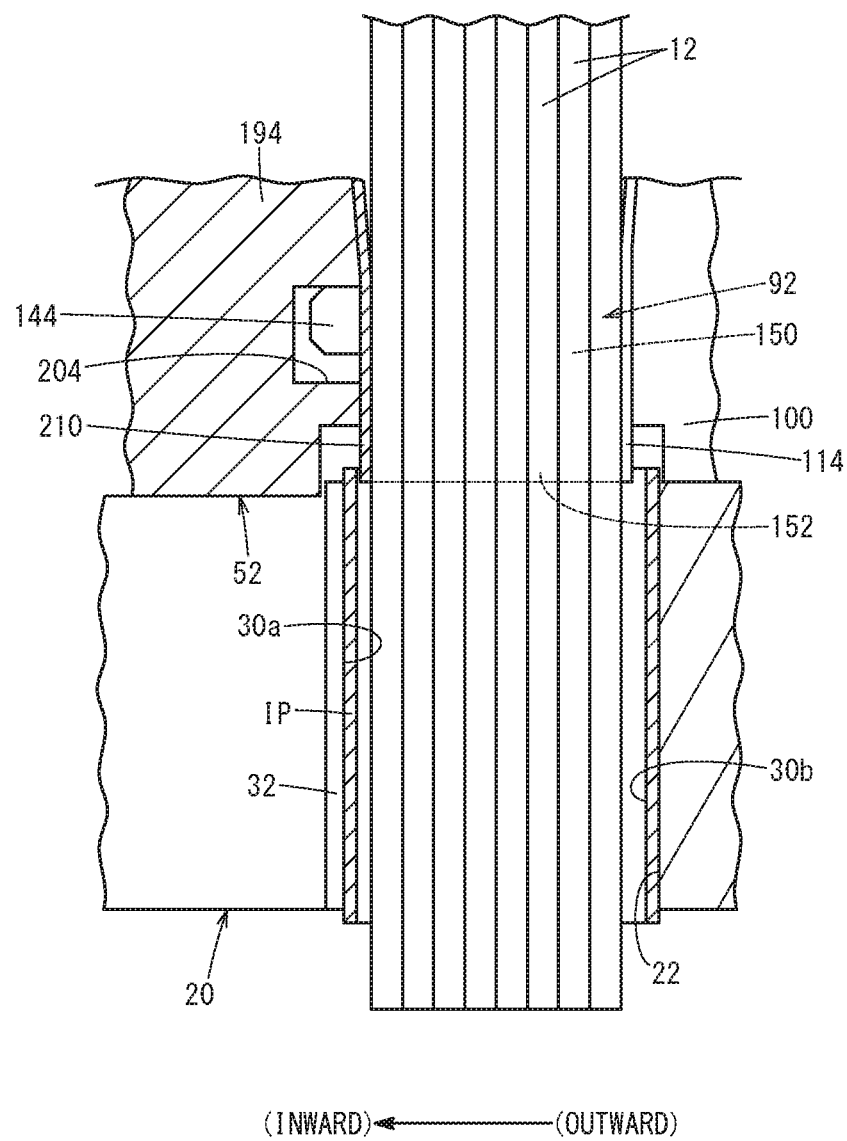
FIG. 20 is a principal part enlarged cross-sectional view showing a state where the legs of the segments have been inserted in the inside of the slot.

Next, the clamp section descends, and, as shown in FIG. 19, the legs 12 of a plurality of the segments 10 are simultaneously inserted in the previously described inner space. Then, when the clamp section releases each of the segments 10, all of the legs 12 slide along the one-way guide member 210, the second-long-side side guide section 152, the second-short-side side guide section 114, and the first-long-side side guide section 150, and enter into a certain slot 22, as shown in FIG. 20. Thus, the present embodiment makes it possible for all of the legs 12 to be inserted in the slot 22 by one time of an operation. Even when some positional misalignment of the legs 12 with respect to the slot 22 has occurred, the positional misalignment of the legs 12 is corrected, whereby the legs 12 are precisely guided into the slot 22, since, as described above, the previously described inner space contracts as the lower side is moved toward. Note that, as may be understood by contrasting FIGS. 19 and 20, when the legs 12 are inserted in the slot 22, the second-short-side side guide section 114 and the one-way guide member 210 slightly bend elastically toward the outer circling wall section 194. Therefore, a clearance between the second-short-side side guide section 114 and a lower end of the block main body section 100, and a clearance between the one-way guide member 210 and a lower end of the outer circling wall section 194, that is, the escape space narrows.

Now, the upper end of the insulating paper IP is covered by the back surfaces of the lower ends of the one-way guide member 210, the second-long-side side guide section 152, the second-short-side side guide section 114, and the first-long-side side guide section 150, and is not exposed. Therefore, the legs 12 that have entered into the slot 22 are prevented from catching on the insulating paper IP. Hence, the insulating paper IP is prevented from being pushed out from the slot 22 or damaged due to receiving a pressing force from the legs 12. That is, the insulating paper IP is inserted with certainty in an intervening manner between the legs 12 and the inner wall of the slot 22, and, as a result, insulation between the segments 10 and the stator core 20 is effected, whereby a short circuit is prevented.

After the legs 12 have been inserted in the slot 22 in this way, the clamp section ascends, and, next, the raising/lowering-oriented rod 200 ascends (refer to FIG. 17). Due to this ascent, the inner peripheral side guide section 52 ascends while being guided by the guide bar 202, and the support block 90 integrally ascends following the inner peripheral side guide section 52. At this time, the coil spring 124 extends, and the slide guide 122 slides relatively with respect to the guide rod 74. Due to the above ascent, the one-way guide member 210, the second-long-side side guide section 152, the second-short-side side guide section 114, and the first-long-side side guide section 150 ascend so as to separate from the slot 22.

Next, the servomotors 304 of the first through twelfth actuators 302*a*-302*l* are energized, whereby the guide shafts 306 retract (refer to FIG. 2). As a result, the first through twelfth slider units 406*a*-406*l* retract so as to radially disperse outwardly in the circumferential direction of the stator core 20, and the stator core 20 is released from constraint of the driving sliders 400 (the engager 310, the sub-engager 312, and the pressers 314). Moreover, at this time, the engagement projection 144 withdraws from the engagement recess 204, whereby coupling of the inner peripheral side guide section 52 and the outer peripheral side guide section 50 is released. That is, a state shown in FIG. 4 is returned to.

Figure 21:
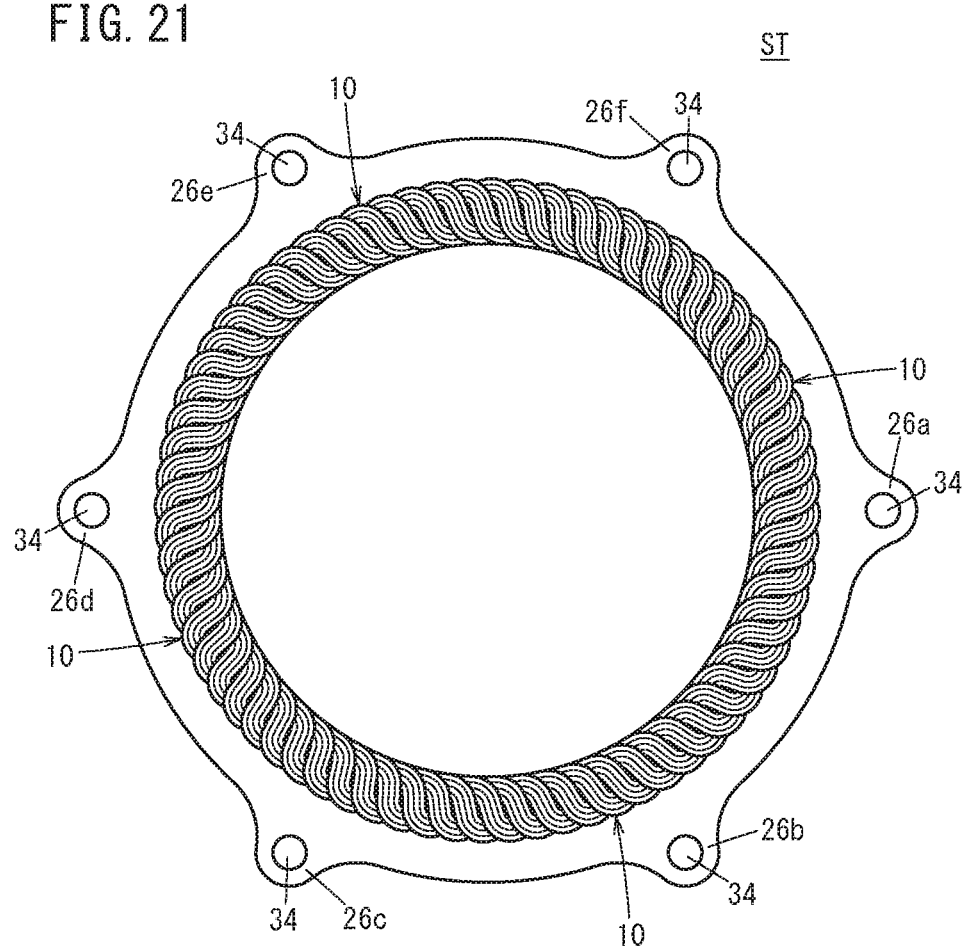
FIG. 21 is a schematic plan view of the stator configured by the segments being inserted in the slots of the stator core.

The stator core 20 that has had the legs 12 inserted in the slots 22 is conveyed to a station where the next work is performed. In the station, twisting of the segments 10 or joining of legs 12, and so on, is implemented, and, as a result, the stator ST shown in FIG. 21 is obtained.

The present invention is not specifically limited to the above-described embodiment, and may be variously modified in a range not departing from the gist of the present invention.

For example, the actuator may be a cylinder, or may be a ball screw mechanism.

What is claimed is:

1. A method of positioning and fixing of a stator core in which, when a stator is obtained by inserting an electrical conductor in a slot formed in the stator core provided with an engaging section, the stator core is positioned and fixed by a positioning and fixing apparatus which comprises a plurality of positioners that are displaced in a direction of approaching or separating from the stator core from an outer side of the stator core, wherein one of the plurality of positioners is an engager that engages with the engaging section, and
the engager includes a rolling body that makes sliding contact with the engaging section,
the method of positioning and fixing of the stator core including:
an engaging step in which the engager is displaced in a direction of approaching the stator core, and engages with the engaging section, whereby the stator core is preliminary positioned and fixed; and
a main positioning step in which one of the plurality of positioners, other than the engager, is displaced in a direction of approaching the stator core, and positions a certain region of the stator core, whereby the stator core is positioned and fixed.

2. The method of positioning and fixing of a stator core according to claim 1, wherein the stator core is further provided with a sub-engaging section, and the positioning and fixing apparatus further comprises a sub-engager that is provided in a position facing the engager, as one of the plurality of positioners, and a sub-engaging step in which the sub-engager is displaced in a direction of approaching the stator core and engages with the sub-engaging section, is performed between the engaging step and the main positioning step.

3. The method of positioning and fixing of a stator core according to claim 2, wherein a pressing force applied to the stator core from the sub-engager is configured smaller compared to a pressing force applied to the stator core from the engager.

4. The method of positioning and fixing of a stator core according to claim 1, wherein a guide member that guides a certain region of the electrical conductor into the slot is provided above the plurality of positioners, and the guide member is positioned with respect to the slot when one of the plurality of positioners abuts on the stator core.

5. A positioning and fixing apparatus of a stator core which comprises a plurality of positioners that, when a stator is obtained by inserting an electrical conductor in a slot formed in the stator core provided with an engaging section, are displaced in a direction of approaching or separating from the stator core from an outer side of the stator core, one of the plurality of positioners being configured as an engager that is displaced in a direction of approaching the stator core and engages with the engaging section, the positioning and fixing apparatus of the stator core comprising:

an actuator that displaces the engager; and another actuator that displaces a remainder of the positioners separately from the engager, and the remainder of the positioners being displaced in a direction of approaching the stator core and thereby configured to position a certain region of the stator core, the engager including a rolling body that makes sliding contact with the engaging section.

6. The positioning and fixing apparatus of a stator core according to claim 5, wherein the stator core is further provided with a sub-engaging section, and one provided in a position facing the engager, of the plurality of positioners is configured as a sub-engager that engages with the sub-engaging section, and the another actuator includes a sub-engager displacing unit configured to displace the sub-engager separately from the engager and the remainder of the positioners.

7. The positioning and fixing apparatus of a stator core according to claim 6, wherein the sub-engager includes a rolling body configured to make sliding contact with the sub-engaging section.

8. The positioning and fixing apparatus of a stator core according to claim 6, wherein a driving force on the sub-engager of the sub-engager displacing unit is set smaller compared to a driving force on the engager of the actuator.

9. The positioning and fixing apparatus of a stator core according to claim 5, wherein a guide member that guides a certain region of the electrical conductor into the slot is provided above the plurality of positioners.

* * * * *